US008811302B2

(12) United States Patent
Santhanam et al.

(10) Patent No.: US 8,811,302 B2
(45) Date of Patent: Aug. 19, 2014

(54) REGULATING THE SCOPE OF SERVICE GEOGRAPHICALLY IN WIRELESS NETWORKS

(75) Inventors: Arvind V. Santhanam, San Diego, CA (US); Hamsini Bhaskaran, San Diego, CA (US); Harleen K. Gill, San Diego, CA (US); Mark A. Maggenti, San Diego, CA (US); Beth A. Brewer, Canyonlake, TX (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 12/727,986

(22) Filed: Mar. 19, 2010

(65) Prior Publication Data
US 2010/0246468 A1 Sep. 30, 2010

Related U.S. Application Data

(60) Provisional application No. 61/163,834, filed on Mar. 26, 2009.

(51) Int. Cl.
*H04Q 7/20* (2006.01)
*H04W 4/02* (2009.01)
*H04W 48/04* (2009.01)
*H04W 64/00* (2009.01)

(52) U.S. Cl.
CPC .............. *H04W 4/02* (2013.01); *H04W 64/00* (2013.01); *H04W 48/04* (2013.01)
USPC .......................................................... 370/329

(58) Field of Classification Search
USPC .................. 370/312, 328–338; 455/456.1
See application file for complete search history.

(56) References Cited

U.S. PATENT DOCUMENTS 5,594,947 A 1/1997 Grube et al.
5,802,468 A * 9/1998 Gallant et al. ............. 455/422.1
(Continued)

FOREIGN PATENT DOCUMENTS

CN 1656842 A 8/2005
EP 1868402 A1 12/2007
(Continued)

OTHER PUBLICATIONS

Virgin Mobiile; Coverage Map; Dec. 22, 2007.*
International Search Report and Written Opinion—PCT/US2010/028630, International Search Authority—European Patent Office—Jan. 24, 2011.
(Continued)

*Primary Examiner* — Hassan Phillips
*Assistant Examiner* — Omeed D Rahgozar
(74) *Attorney, Agent, or Firm* — Raphael Freiwirth

(57) ABSTRACT

In an embodiment, a network communication entity obtains a location associated with an access terminal that is attempting to participate in a communication service, determines whether the obtained location satisfies a relationship with a defined location region, the defined location region establishing a first level of service restriction for the communication service within the defined location region and establishing at least a second level of service restriction for the communication service outside of the defined location region, and restricts the access terminal in accordance with the first or second level of service restriction for the communication service based on the determination. The network communication entity may correspond to the access terminal, an access network or an application server. If the access terminal detects a current, imminent or future service restriction, the given access terminal can initiate handoff to another service mechanism and/or inform the user of the service restriction.

61 Claims, 18 Drawing Sheets

Example of Location Restriction Enforced at Access Terminal

(56) References Cited

U.S. PATENT DOCUMENTS

| | | |
|---|---|---|
| 7,453,835 B1 | 11/2008 | Coty et al. |
| 2001/0018349 A1* | 8/2001 | Kinnunen et al. ............ 455/456 |
| 2004/0095954 A1* | 5/2004 | Varney et al. ................. 370/444 |
| 2004/0236848 A1 | 11/2004 | Roy et al. |
| 2005/0083840 A1 | 4/2005 | Wilson |
| 2006/0218262 A1* | 9/2006 | Abeta et al. ................... 709/223 |
| 2006/0262751 A1* | 11/2006 | Vermola et al. ............... 370/331 |
| 2008/0081618 A1* | 4/2008 | Krantz et al. ................. 455/434 |
| 2008/0137607 A1 | 6/2008 | Ju et al. |
| 2009/0003281 A1 | 1/2009 | Panabaker |

FOREIGN PATENT DOCUMENTS

| | | |
|---|---|---|
| JP | 2006101475 A | 4/2006 |
| WO | WO0018156 A1 | 3/2000 |
| WO | WO03101140 A1 | 12/2003 |
| WO | WO2004059912 A1 | 7/2004 |
| WO | WO2006039119 A1 | 4/2006 |
| WO | 2008040389 A1 | 4/2008 |

OTHER PUBLICATIONS

European Search Report—EP12161578—Search Authority—The Hague—Nov. 25, 2013.

* cited by examiner

Example of Multicasting Service Area

Example of Location Restriction Enforced at Application Server

Example of Location Restriction Enforced at Application Server

Example of Location Restriction Enforced at Application Server

Example of Location Restriction Enforced at Access Terminal

Example of Location Restriction Enforced at Access Terminal

*FIG. 10*   Example of Location Restriction Enforced at Access Terminal

Example of Location Restriction Enforced at Access Terminal

Example #1 of Provisioning the RAN with the defined location region for location restriction Example #2 of Provisioning the RAN with the defined location region for location restriction Example #3 of Provisioning the RAN with the defined location region for location restriction Example of Location Restriction Enforced at Access Network Example of Location Restriction Enforced at Access Network

REGULATING THE SCOPE OF SERVICE GEOGRAPHICALLY IN WIRELESS NETWORKS

CLAIM OF PRIORITY UNDER 35 U.S.C. §119

The present application for patent claims priority to Provisional Application No. 61/163,834, entitled "REGULATING THE SCOPE OF SERVICE GEOGRAPHICALLY IN WIRELESS NETWORKS", filed Mar. 26, 2009, which is assigned to the assignee hereof and hereby expressly incorporated by reference herein in its entirety.

BACKGROUND OF THE INVENTION

1. Field of the Invention

Embodiments of the present invention are directed to regulating the scope of service geographically in wireless networks.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a network communication entity obtains a location associated with an access terminal that is attempting to participate in a communication service, determines whether the obtained location satisfies a relationship with a defined location region, the defined location region establishing a first level of service restriction for the communication service within the defined location region and establishing at least a second level of service restriction for the communication service outside of the defined location region, and restricts the access terminal in accordance with the first or second level of service restriction for the communication service based on the determination. The network communication entity may correspond to the access terminal, an access network or an application server. If the access terminal detects a current, imminent or future service restriction, the given access terminal can initiate handoff to another service mechanism and/or inform the user of the service restriction.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
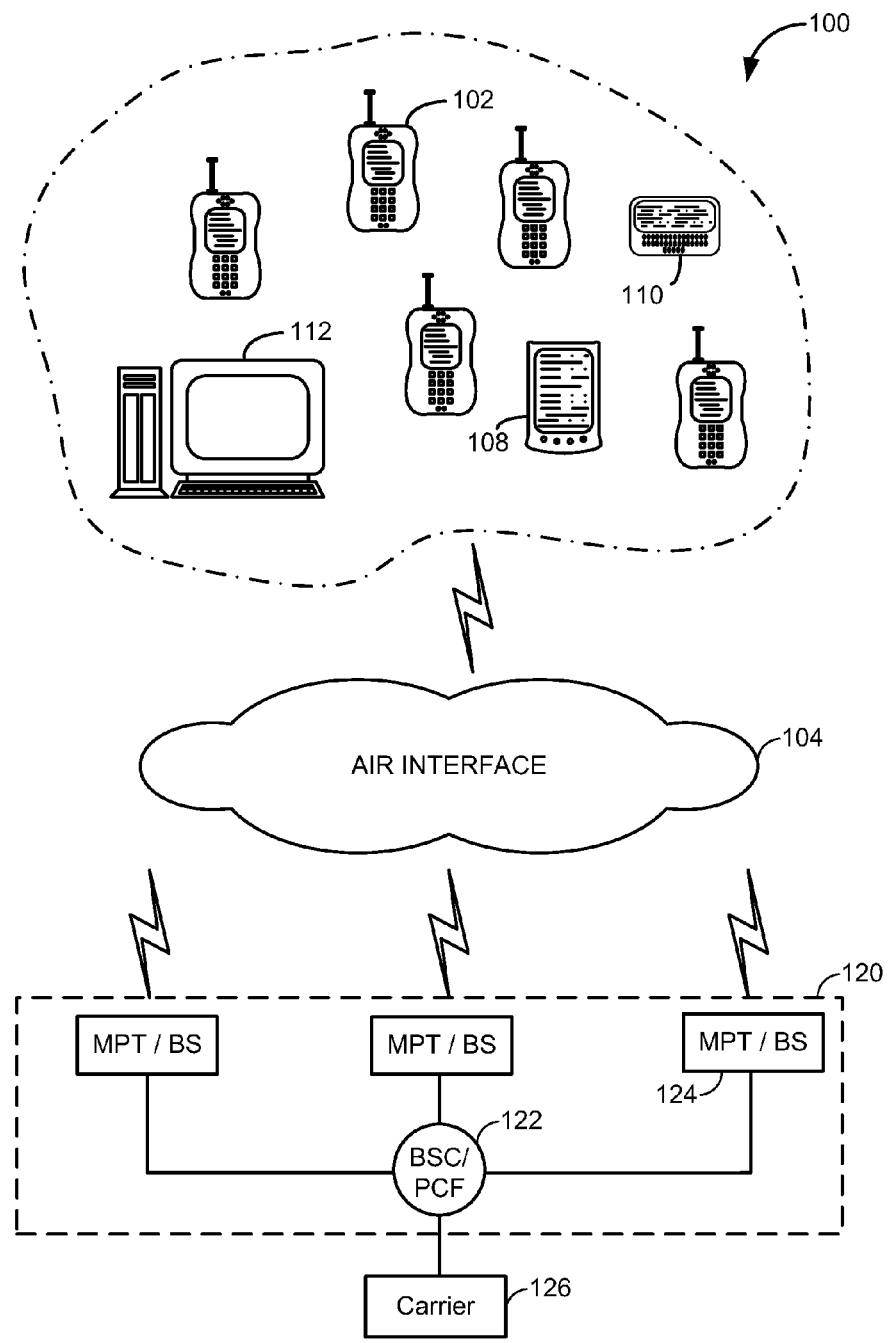
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
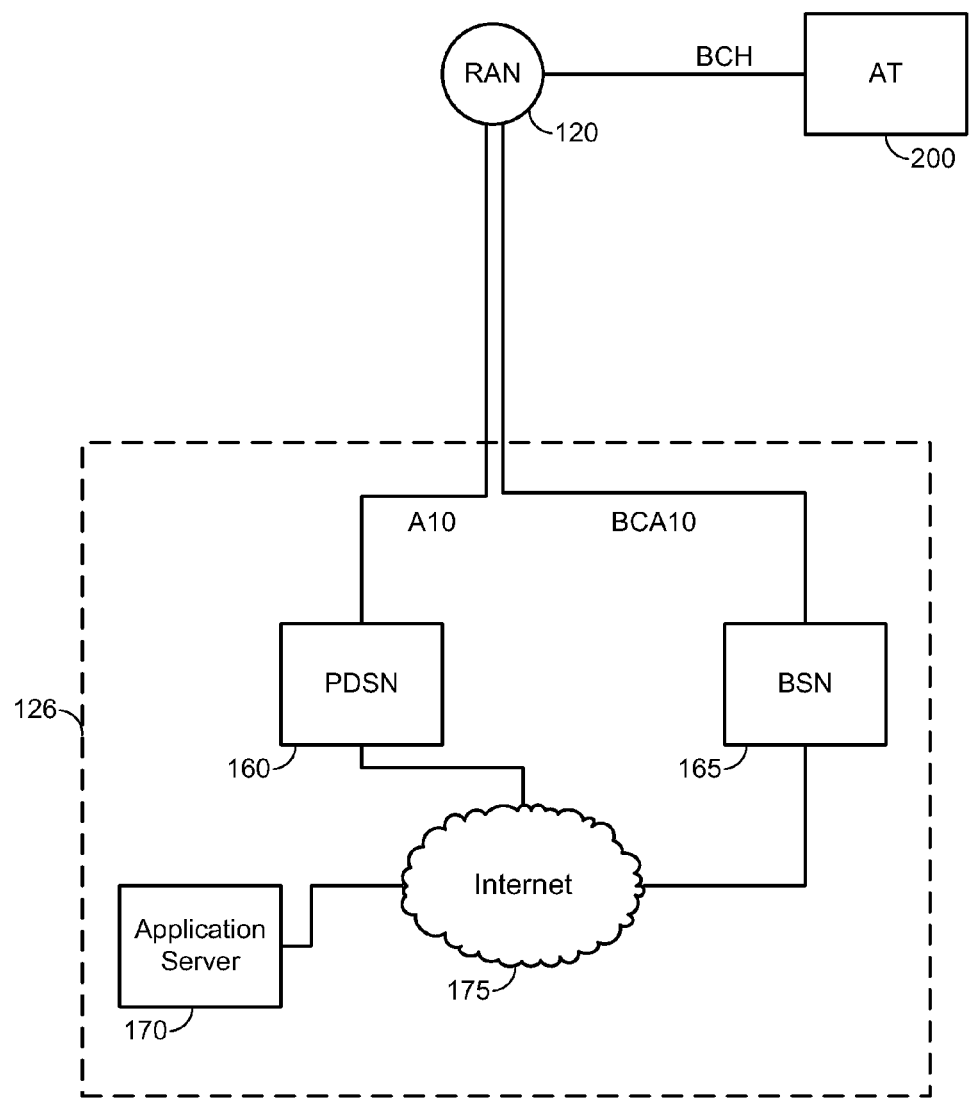
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
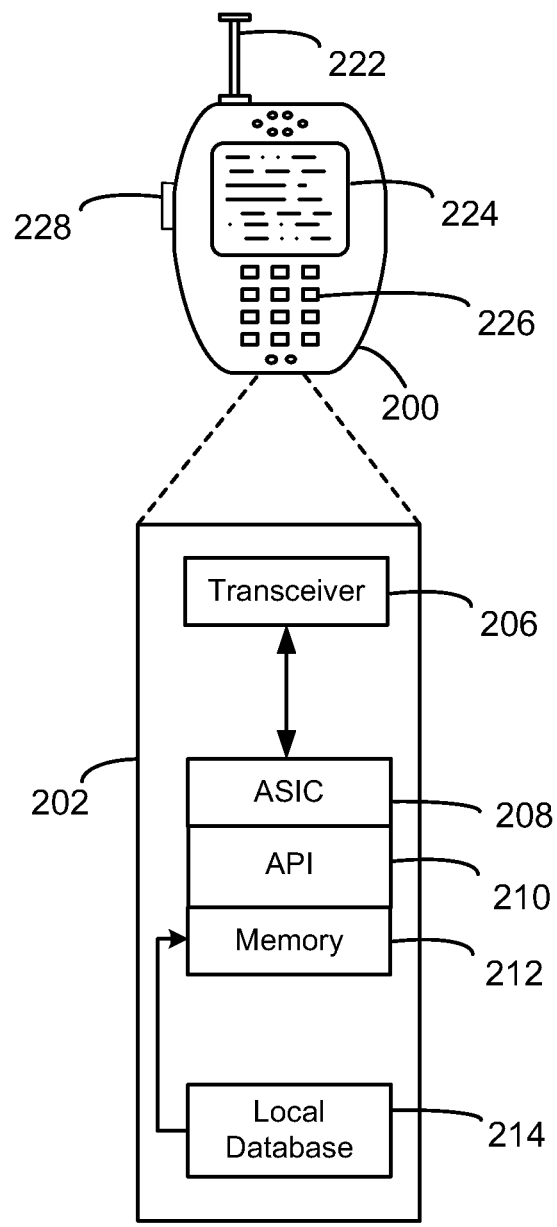
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4A:
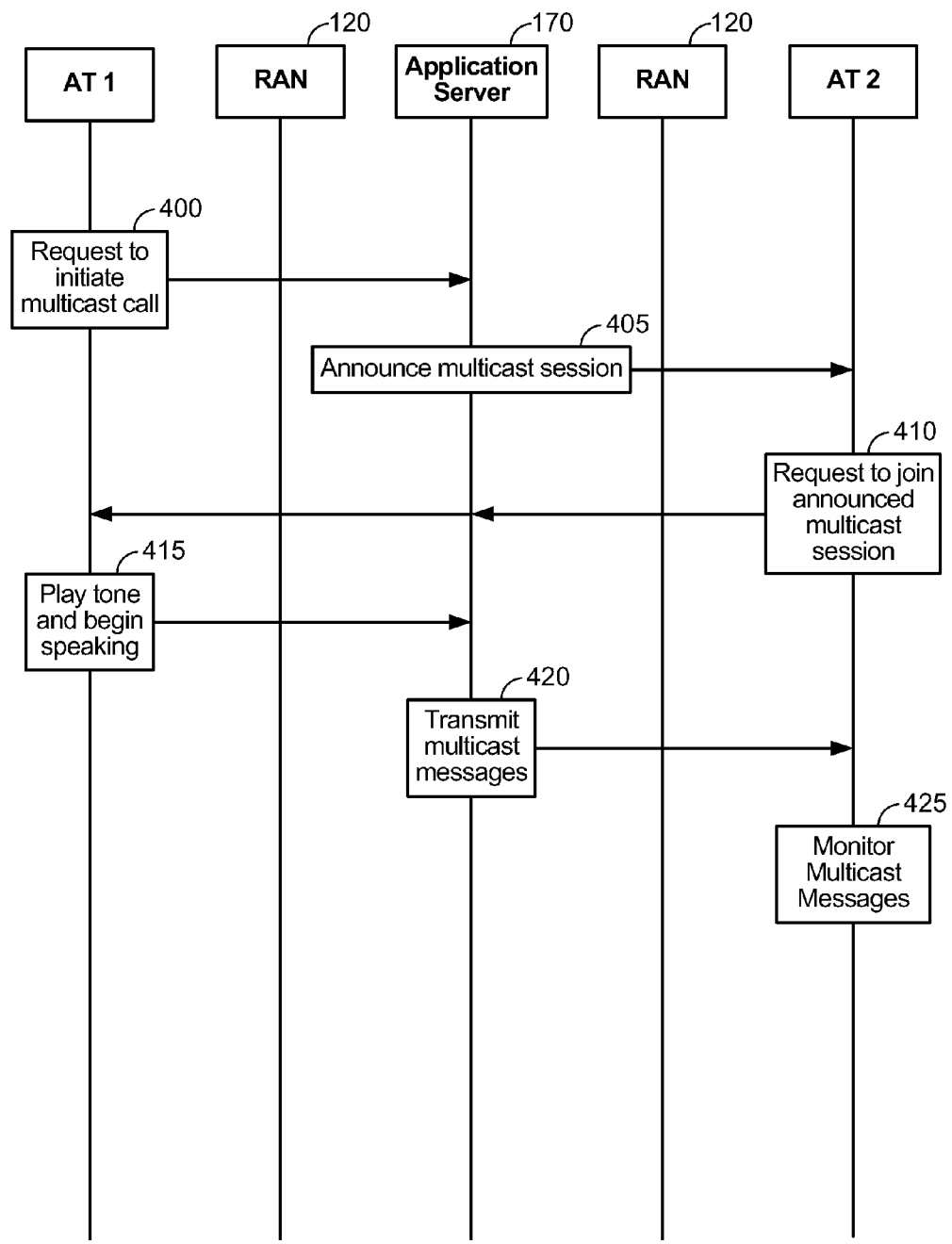
FIG. 4A illustrates a conventional call set-up process for a given multicast session.

FIG. 4A illustrates a conventional call set-up process for a given multicast session (e.g., a push-to-talk (PTT) session, a push-to-transfer (PTX) session, a broadcast and multicast service (BCMCS) session, etc.). In 400, a given AT ("AT 1") sends a message on a reverse link access channel to the RAN 120 to request initiation of a multicast call or session to a plurality of ATs. For example, the request sent from AT 1 in 400 can be performed in response to a push of a PTT button by a user of AT 1, if the given multicast session corresponds to a PTT session. The RAN 120 receives the multicast call request from AT 1 on the reverse link access channel and forwards the message to the application server 170. Upon receiving the multicast call request, the application server 170 generates and forwards an announce message for announcing the given multicast session to the plurality of ATs, or multicast group, 405. While not shown in FIG. 4A, the application server 170 may first authenticate or validate AT 1 before sending the announce message to ensure that AT 1 has permission to conduct or initiate the multicast call (e.g., by checking if AT 1 belongs to the multicast group for the given multicast session). In FIG. 4A, assume that a given target AT ("AT 2") belongs to the multicast group associated with the announce message. Thus, in 405, the application server 170 forwards the announce message to the RAN 120 (e.g., via the PDSN 160 and/or BSN 165) for transmission to the plurality of ATs in the multicast group at least within AT 2's sector.

Referring to FIG. 4A, assume that AT 2 receives the announce message and determines to accept the multicast call. Accordingly, in 410, AT 2 responds to the announce message by sending an announce acknowledgment (ACK) message indicating acceptance of the multicast call on the reverse link access channel to the RAN 120, which forwards the announce ACK acceptance message to the application server 170. While not shown in FIG. 4A, AT 2 may also send a registration message (e.g., a BCMCSFlowRegistration message) to the RAN 120 to register for the multicast session. Assuming that AT 2 is a first responder to the announce message, the application server 170 sends a message instructing AT 1 that the multicast session can begin. AT 1 receives the message, plays a tone to a user of AT 1 indicating that he/she can begin speaking, and AT 1 begins forwarding voice data to the application server 170 for transmission to the multicast group, 415. The application server 170 forwards the voice data, or multicast packets, for transmission by the RAN 120 to the multicast group members that have registered for the given multicast session, 420, and at least the registered multicast group members, including AT 2, monitor the given multicast session, 425. In some implementations, additional signaling messages may be exchanged during call setup between the access terminal(s) and the server (to determine the IP address, port #s, SSRC etc.) before the media transmission is initiated by the originating client.

As will be appreciated by one of ordinary skill in the art, while the application server 170 may attempt to validate ATs that attempt to participate in a multicast session, for example by checking whether the requesting ATs belong to a multicast group associated with the multicast session, other information, such as a physical location of the ATs, is not known at the application server 170. Rather, this type of information is known at the RAN 120, or at the ATs themselves, but is not accessible at the application server 170. Accordingly, it is the RAN 120's function to figure out where ATs are located when the application server 170 forwards messages intended for selected ATs or groups of ATs.

Referring to FIG. 4A, it will be appreciated that a conventional unicast call can include the exchange of contract and contact-ACK messages between the application server 170 and the call participants, which collectively function to convey an IP address and port number of a media server (e.g., a MCC), SSRCs, etc., after which a tone to start the session is played on the initiator or originator. In FIG. 4A, the contact and contact-ACK messages are not explicitly illustrated. As an example, however, these contact and contact-ACK messages can be considered to be implicit in FIG. 4A, even though the respective messages are not shown explicitly. As an alternative example, as discussed briefly above, the session data that would typically be conveyed via the contact message can be provided in advance, or apriori, such as in one or more of the call set-up messages shown in FIG. 4A. Similarly, embodiments of the invention discussed below can convey the above-noted session information via either contact messages, or alternative apriori via one or more call-setup messages.

Figure 4B:
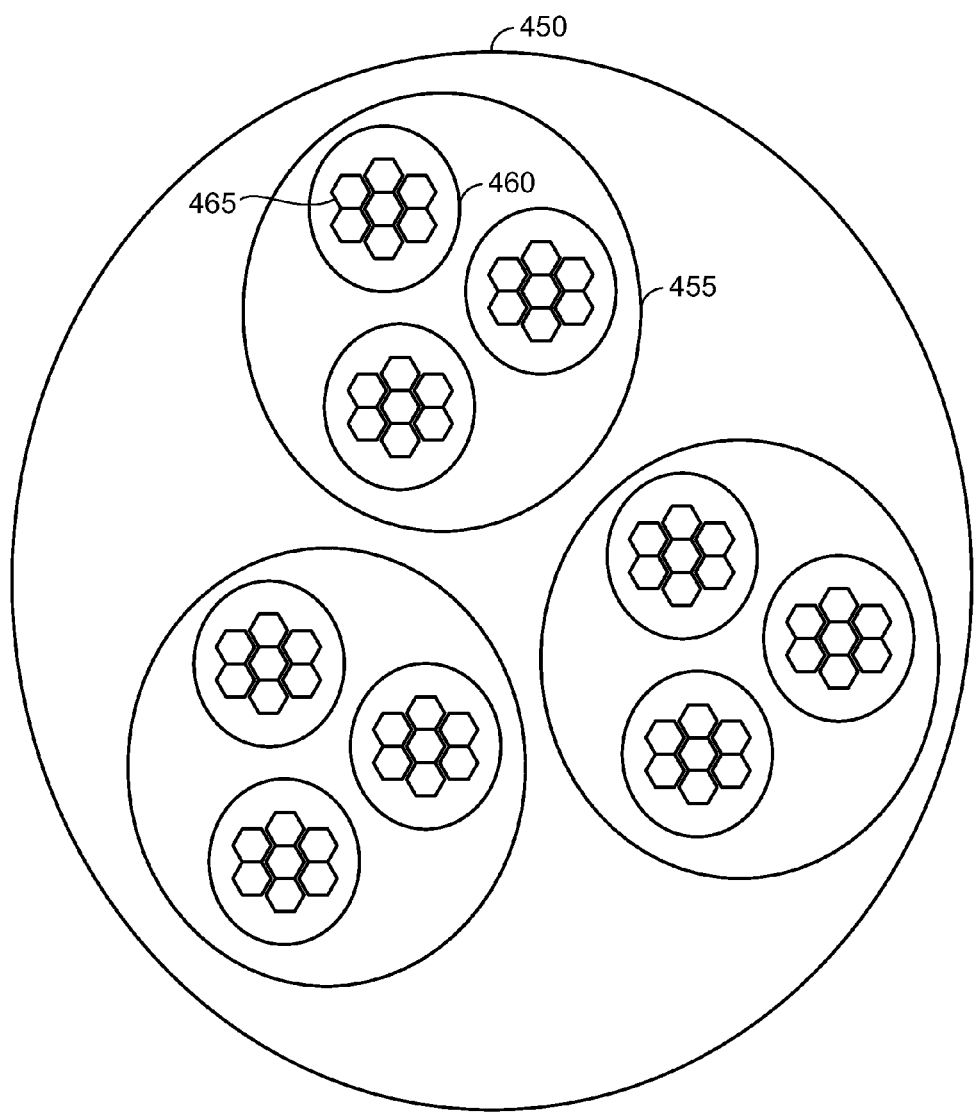
FIG. 4B illustrates an example of a multicasting service area that may be covered by an application server.

Accordingly, because the application server 170 is not typically aware of the location or position of multicast group members participating in an active multicast session, it is difficult to enforce location-based restrictions in multicast communications. An example will now be provided with respect to FIG. 4B. FIG. 4B illustrates an example of a multicasting service area 450 that may be covered by the application server 170. As shown in FIG. 4B, the multicasting service area 455 may include a plurality of PDSN service areas 455 that are each managed by a different PDSN 160, each PDSN service area 455 in turn includes a plurality of subnets 460 that are each managed by a different RNC, and each subnet includes a plurality of sectors 465.

In an example, assume that a network operator that controls the application server 170 deems certain sectors, subnets and/or PDSN service areas within the multicasting service area 450 not suitable for multicast service (e.g., because the load in these service areas is high, etc.). Conventionally, the network operator is not able to restrict calls to particular service areas because, as discussed above, information related to multicast group member locations is known at the RAN 120, but not at the application server 170.

In another example, assume 100 hikers are part of a hiking multicast group, but only 50 of those hikers are on a particular hiking expedition in a region serviced by a single subnet 460. If one of the hikers on the expedition wishes to talk only to other hikers on the expedition, the multicast session would still be announced to all 100 hikers, and would not be restricted to the 50 hikers on the expedition without manual instructions to the application server 170 from the call initiator (e.g., such as instructions to manually form a new multicast group only including the hikers known to be on the expedition, which can be tedious to obtain an accurate headcount and enter into the system).

Accordingly, embodiments of the invention are directed to determining a degree in which to restrict (e.g., permit, block, a rate to charge, etc.) a communication session (e.g., a group call serviced with multicast protocols, a group call serviced with unicast protocols, a non-group call between two ATs serviced with unicast protocols, a non-call transport session, etc.) based on an access terminal's location within a wireless communications system. While embodiments of the invention described below are described generally to group calls serviced in accordance with multicast protocols, it will be appreciated that other embodiments can be directed to restricting service to other types of communication sessions (e.g., unicast calls, transport sessions, etc.). Also, while embodiments are generally described with respect to a first area wherein calls are restricted, and a second area wherein calls are not restricted, it will be appreciated that the areas can alternatively be associated with different degrees of restriction instead of simply a permit-or-block type implementation. For example, certain subnets may support group calls via multicast protocols, wherein other subnets may support group calls via unicast or multicast protocols. In this case, the subnets (or other location regions) that support group calls with fewer protocols, or subnets that charge more for multicast service, can be considered to have a higher degree of restriction.

Figure 6:
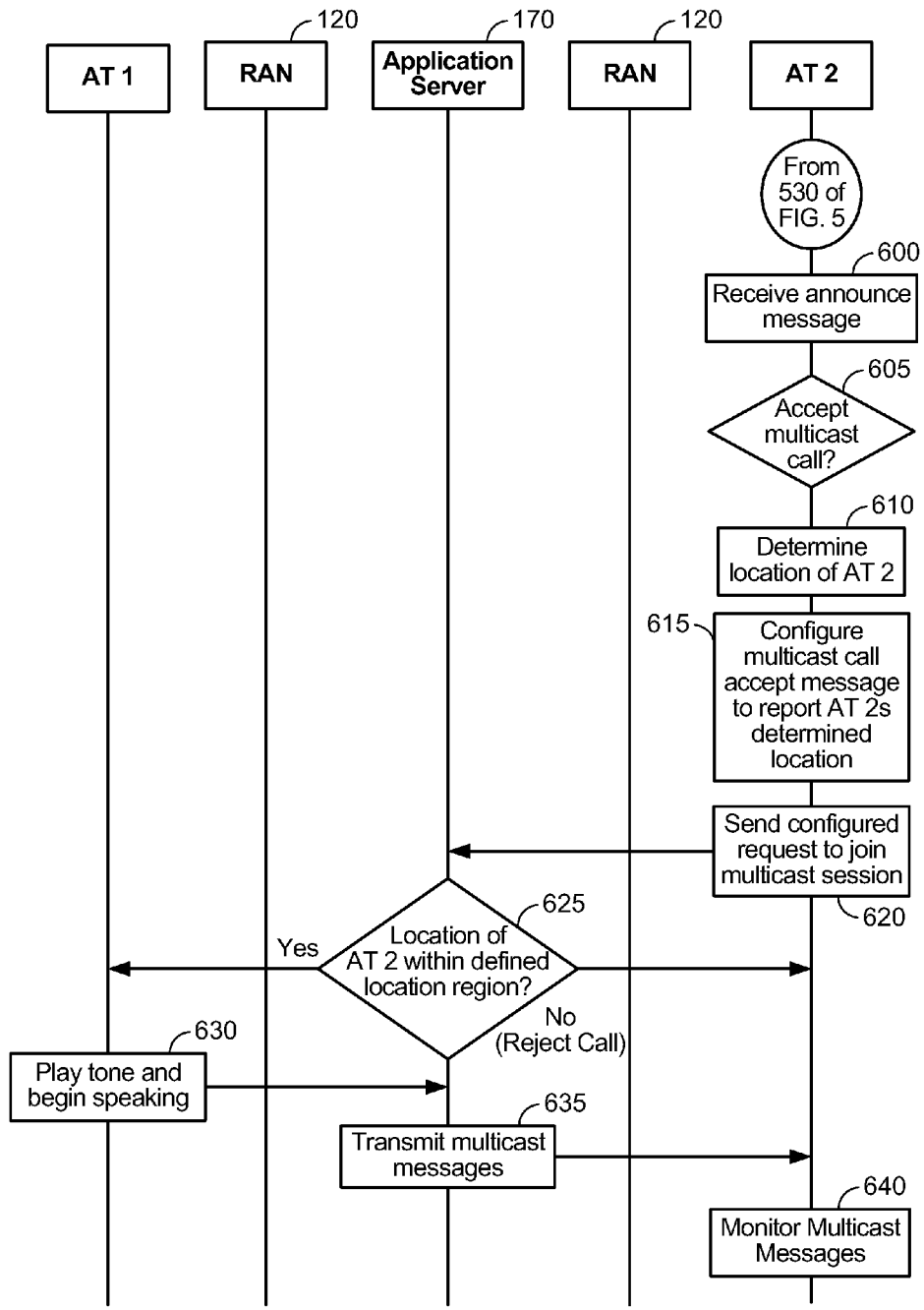
FIG. 6 illustrates a continuation of the process of FIG. 5 according to an embodiment of the present invention.
Figure 7:
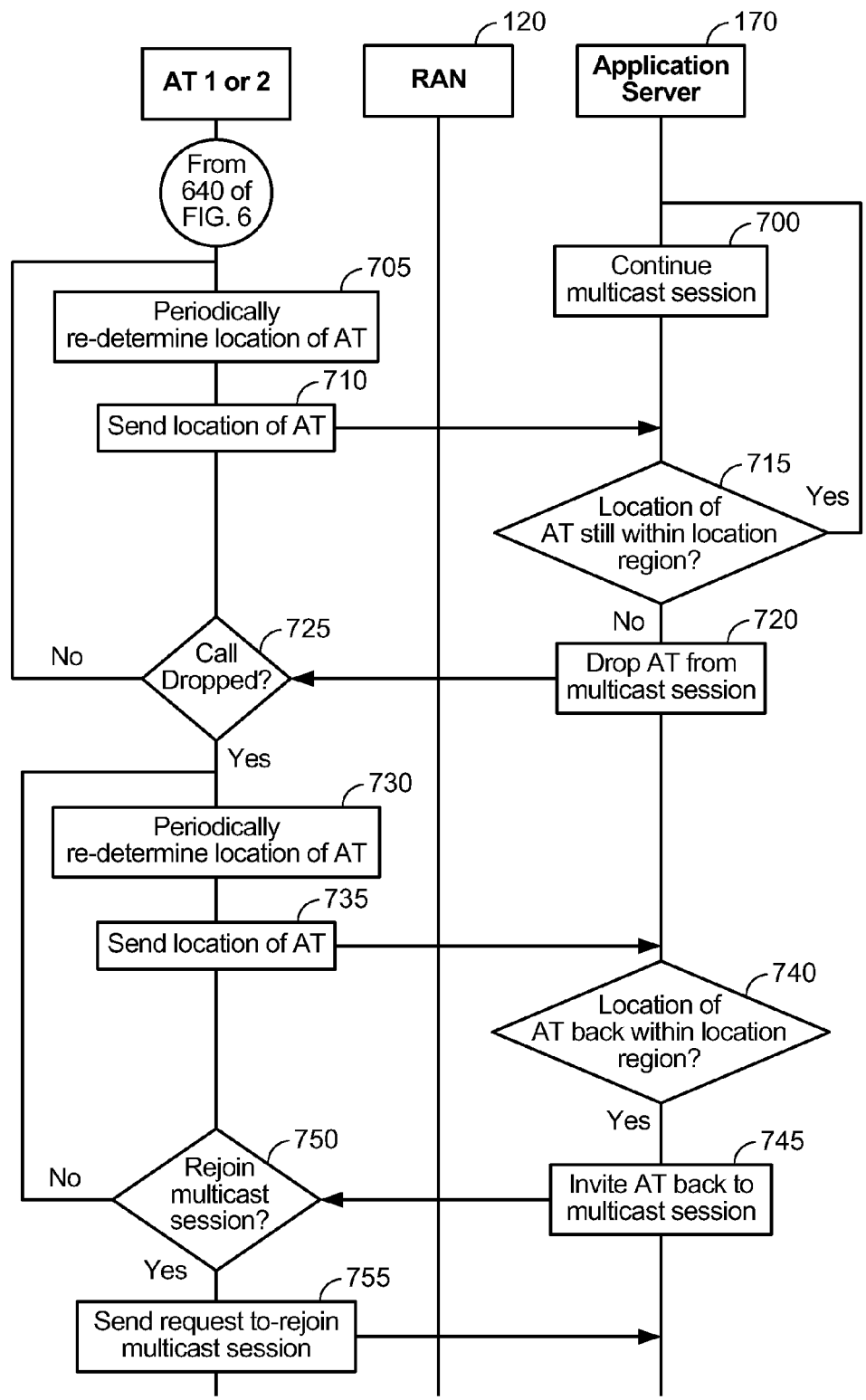
FIG. 7 illustrates a continuation of the process of FIG. 6 according to an embodiment of the present invention.
Figure 8:
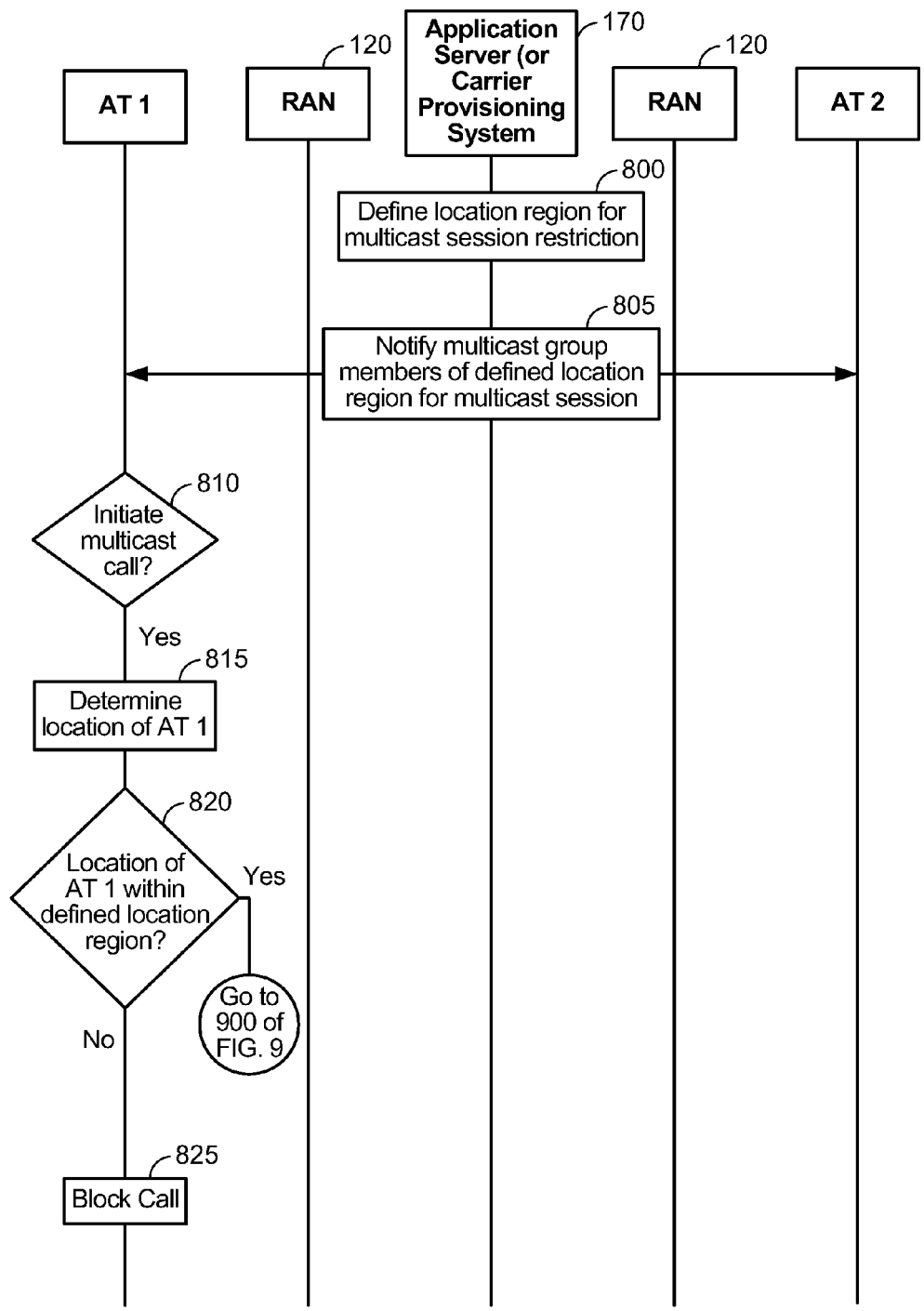
FIG. 8 illustrates a multicasting process including location-based multicast call restriction enforced at an access terminal according to an embodiment of the present invention.
Figure 9:
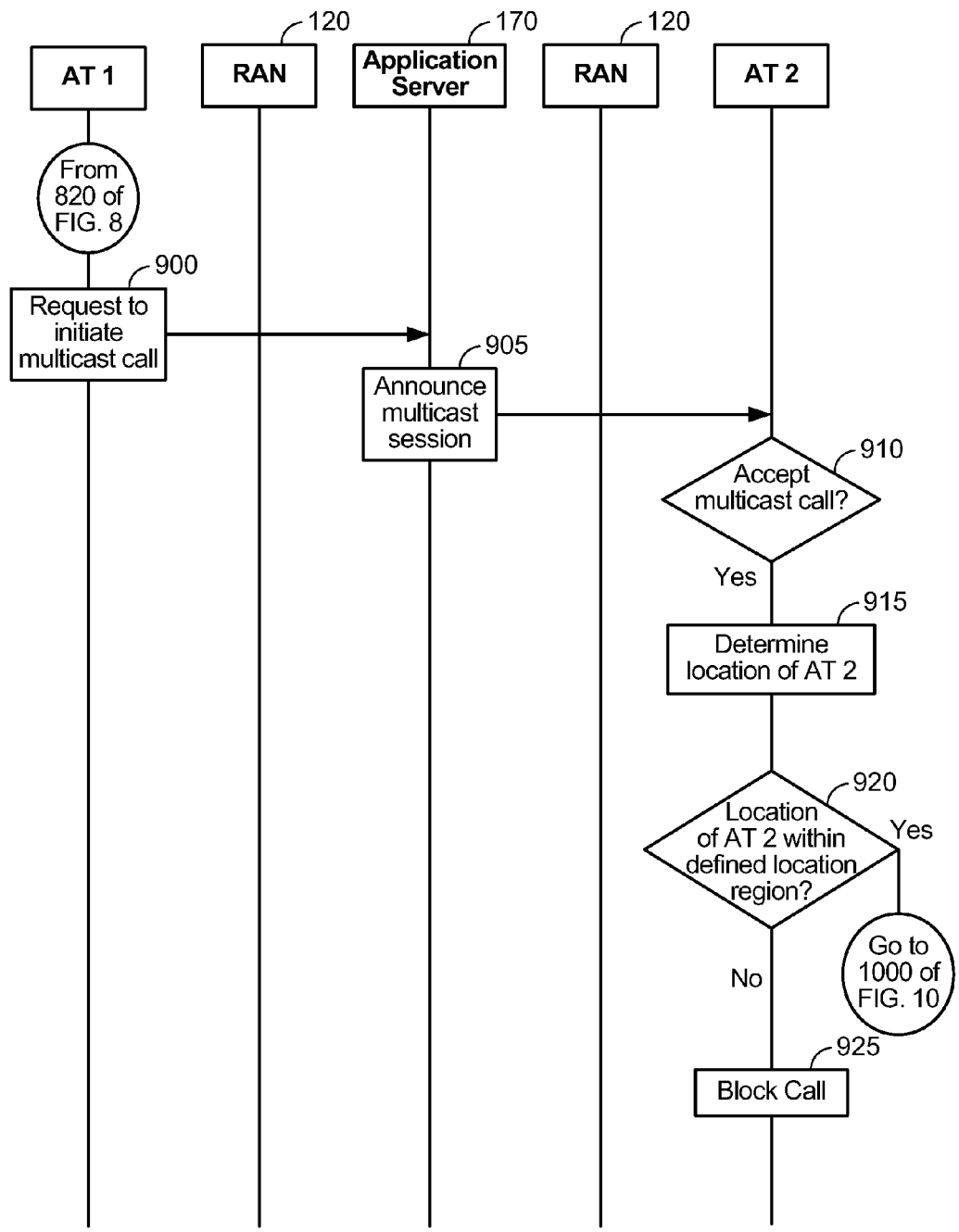
FIG. 9 illustrates a continuation of the process of FIG. 8 according to an embodiment of the present invention.
Figure 10:
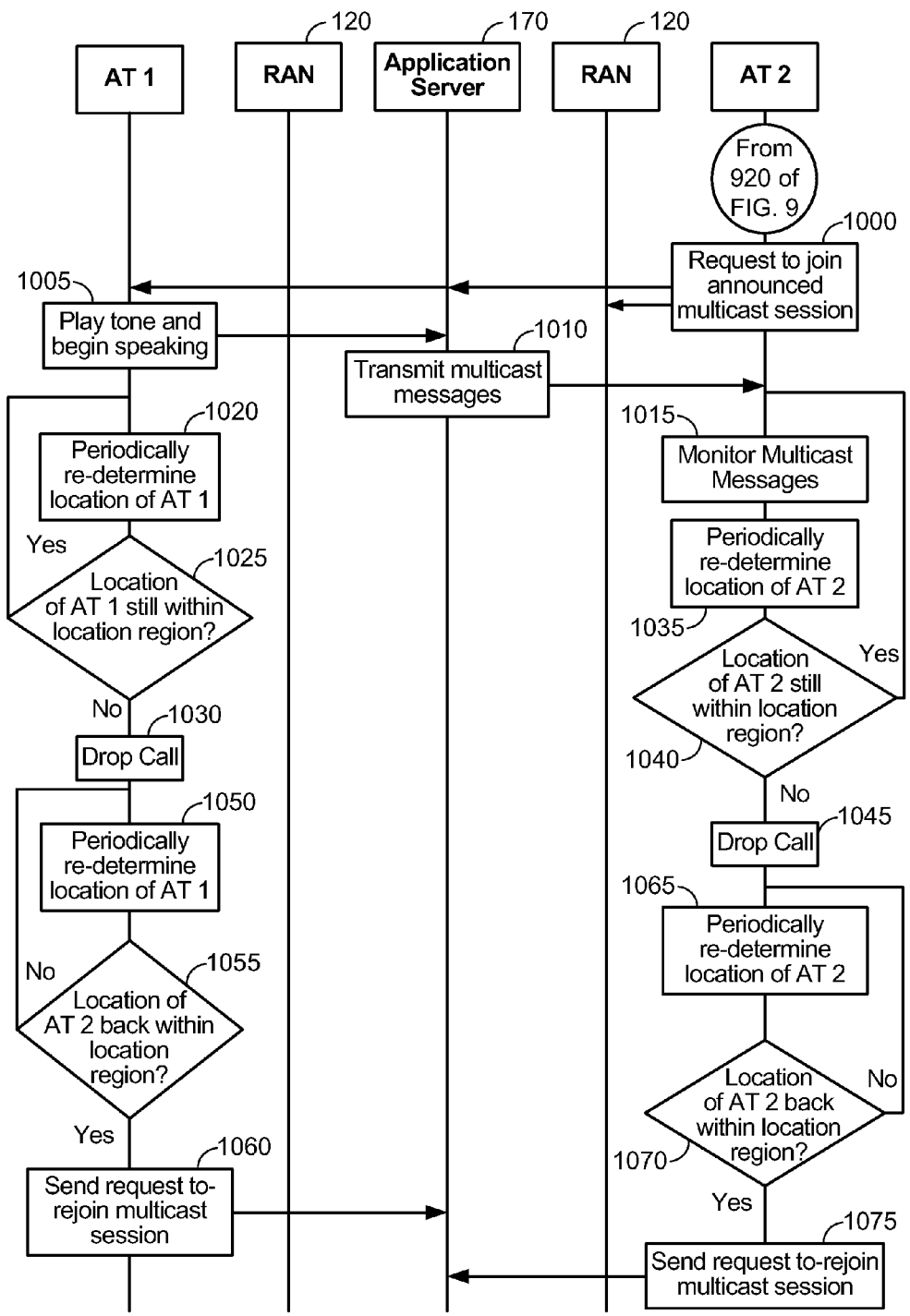
FIG. 10 illustrates a continuation of the process of FIG. 9 according to an embodiment of the present invention.

The embodiments can be directed to an initiator of the multicast call, or to a target of the multicast call, and can be directed towards call set-up and/or already active call sessions within the system, as will now be described in more detail with respect to FIGS. 5 through 10. In particular, FIGS. 5 through 7 are directed to location-based multicast call restriction enforced at the application server 170, whereas FIGS. 8 through 10 are directed to location-based multicast call restriction enforced at individual access terminals.

Figure 5:
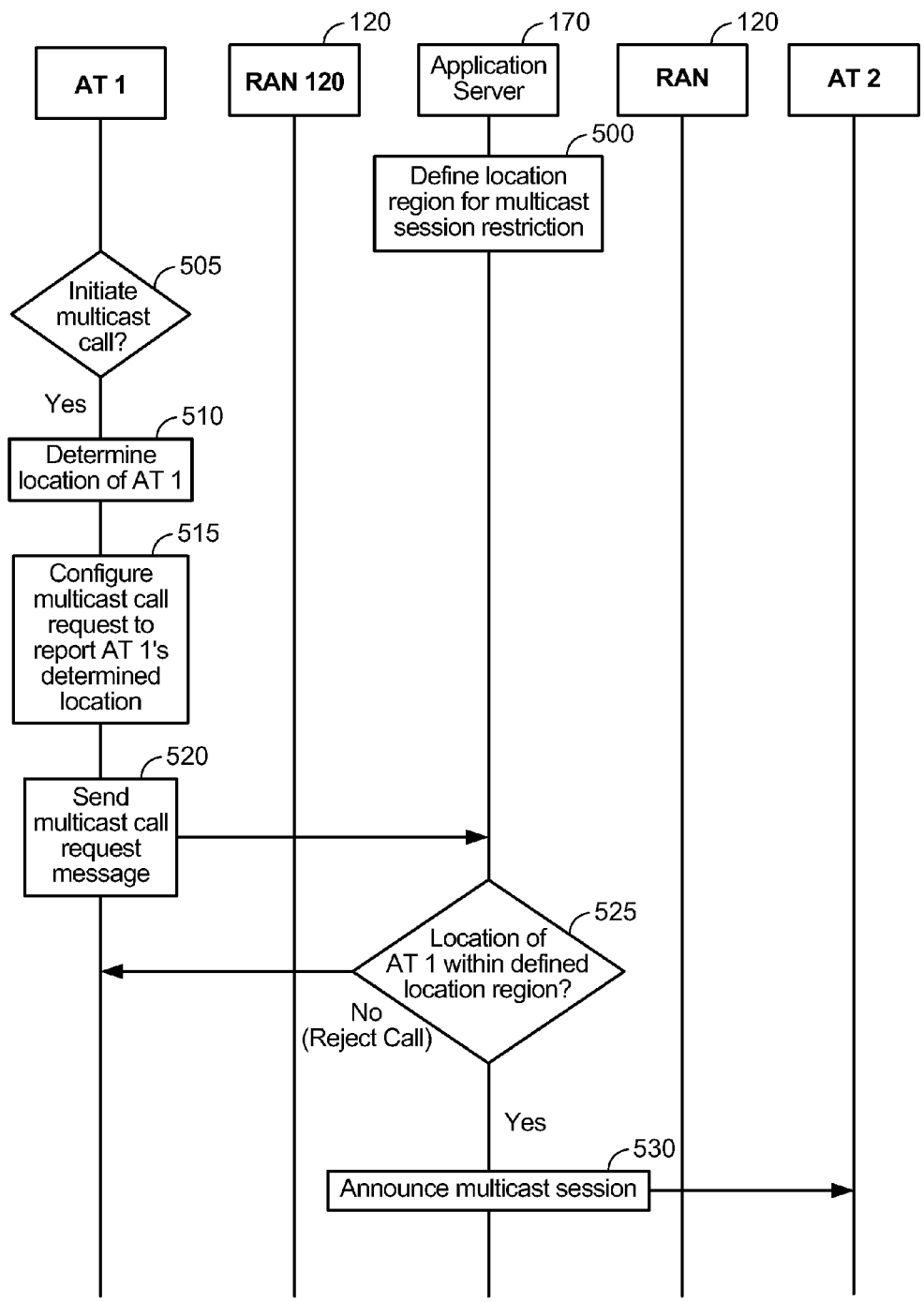
FIG. 5 illustrates a multicasting process including location-based multicast call restriction enforced at an application server according to an embodiment of the present invention.

Accordingly, FIG. 5 illustrates a multicasting process including location-based multicast call restriction enforced at an application server according to an embodiment of the present invention. Referring to FIG. 5, in 500, a network operator at the application server 170 defines a location region for multicast service restriction (e.g., for one or more individual multicast groups, or for all multicast groups associated with a particular type of multicast service, such as QChat). Alternatively, a network operator of a carrier provisioning system (CPS) that is separate from the application server 170 may define the location region and then provision the application server 170 with the defined location region in 500. In an example, the defined location region can be for inclusion (e.g., only allow participants that are within the defined location region) or exclusion (e.g., only allow participants that are not within the defined location region). Below, while examples are provided primarily directed to the 'inclusion' embodiment, it will be appreciated that these examples can be configured for 'exclusion' simply by inverting the result of the evaluation (e.g., if an AT is within the defined location region for inclusion, it is permitted to participate in the multicast call, whereas the opposite is true for exclusion). The defined location region can also be established with a time parameter and/or other triggering criteria, such that the defined location region is only used for restriction when other conditions are also satisfied (e.g., during normal work hours, etc.). Further, it will be appreciated that the defined location region establishes a first level of multicast service restriction for one or more ATs within the defined location region (e.g., an 'unrestricted' level of restriction), and a second level of multicast service restriction for one or more ATs outside of the defined location region (e.g., a denial of service level of restriction, such that the service is disabled outside of the defined location region). It will be appreciated that other examples can be directed to other, intervening levels of service restriction.

In a further example, the defined location region can be multicast-group specific, such that only multicast calls for one or more particular multicast group are restricted based on the defined location region. Alternatively, the defined location region can be global or universal, such that all multicast-groups serviced by the application server 170 are affected by the location constraints or restrictions of the defined location region in 500. In another example, the defined location region can be AT-specific, such that the defined location region only operates to restrict service to a particular AT or ATs.

The defined location region can be configured in any number of ways. For example, in a 1xEV-DO Rev. A network, a 128-bit SectorID uniquely identifies a sector and is broadcast as part of a SectorParameters message, which is transmitted from the RAN 120 at a given interval within each sector of the wireless communication system 100. Thus, in an example, the defined location region can correspond to a list of SectorIDs (e.g., or alternatively, one or more of a BASE_ID, SID, NID and/or PZID). In this example, the defined location region is at a sector-level (e.g., see sectors 465 of FIG. 4B). In an alternative example, the defined location region can include one or more of a sector identifier (e.g., the 128-bit SectorID), a subnet identifier (e.g., see 460 of FIG. 4B), a PDSN serving region identifier (e.g., see 455 of FIG. 4B) and/or an identifier of an entire multicasting service area (e.g., see 450 of FIG. 450). In a further example, in a 3G 1x network, the network operator can define location regions at the granularity of a BASE_ID, SID, NID or PZID, or based on an identifier of home-regions at the application server-level instead of the RAN-level. For example, in a 1xEV-DO Rev. A network, the network operator can define location regions at the granularity of a SectorID or a SubnetID which is derived from the SectorID (e.g., where each subnet maps to a single RNC). Thus, one or more identifiers corresponding to locations of service areas of different magnitudes can collectively define the defined location region in 500.

In an alternative example, instead of configuring the defined location region by service region (e.g., at a sector, subnet, PDSN and/or multicast service area level), the defined location region can be based on geographic coordinates, such as longitude or latitude. Also, as discussed below in more detail with respect to 525 of FIG. 5, the geographic region can correspond to a two-dimensional (2-D) (e.g., a grid) or three-dimensional (3-D) space (e.g., a sphere, such as the Earth).

In the example of FIG. 5, assume that the application server 170 retains the defined location region after it is generated in 500. At some point in time after 500 of FIG. 5, a given AT ("AT 1") that belongs to the multicast group for which the location region is defined in 500 determines whether to initiate a multicast call to the multicast group, 505. In the example of FIG. 5, assume that AT 1 determines to initiate the multicast call.

Next, in 510, AT 1 determines its location within the wireless communications system 100. The location determination of 510 can be performed in a number of ways. For example, in a 1xEV-DO Rev. A network, if AT 1 determines its location based on which serving sector AT 1 resides in within the system, AT 1 can determine the 128-bit SectorID of its serving sector to determine its location. The 128-bit SectorID can be determined based on a receipt of a SectorParameters message broadcast from the RAN 120 in AT 1's sector, and the SectorID can then be cached or stored in AT 1 and fetched during 510 of FIG. 5. Alternatively, the 128-bit SectorID can be determined based on a periodic polling of the RAN 120 by AT 1, and the SectorID can then be cached or stored in AT 1 and fetched from the local cache during 510 of FIG. 5. In another alternative example, because AT 1 is the originator of the multicast call in FIG. 5, the 128-bit SectorID can be requested 'on demand' after AT 1 determines to initiate the multicast call in 505. As will be appreciated, the SectorID is kept more up-to-date if the SectorID is obtained more frequently (e.g., via polling, on-demand queries and/or waiting for a SectorParameters message, or in 1x, an ID similar to the SectorID conveyed via a SystemParameters message), although the increased signaling may raise interference in AT 1's sector.

Alternatively, if AT 1 or system 100 does not comply with 1xEV-DO Rev. A, AT 1 can determine another type of identifier that identifies its sector, or its current serving base station within system 100. For example, in 1x, the BASE_ID field is 16 bits and defines AT 1's serving base station. The BASE_ID taken in conjunction with the SID/NID/PZID may correspond to a unique identification of the sector in which AT 1 is located, which can be used as AT 1's determined location in 510 of FIG. 5. This information may be obtained via polling, on-demand queries and or a signaling message, such as a SystemParameters message in 1x, as discussed above with respect to the 128-bit SectorID.

In another alternative example, with respect to 510 of FIG. 5, AT 1 can determine a geographic location as its determined location (e.g., AT 1's position, or a position or position range associated with AT 1's sector). For example, the geographic location can be represented by longitude and latitude coordinates, which may be obtained a satellite positioning system (SPS) such as GPS, network trilateration, a terrestrial signal based positioning process, a network-assisted positioning process, etc. The determined geographic location can be for AT 1's specific location, or can be coordinates for AT 1's serving base station, or any point within AT 1's sector, in an example.

After determining its location in 510, AT 1 configures a multicast call request message to request that the application server 170 initiate a multicast session, and also to convey, to the application server 170, AT 1's location. Alternatively, AT 1 can configure a separate message that conveys its location information to the application server 170, such that the location information is not necessarily bundled with the multicast call request message. Thus, a "configured" multicast call request message may actually correspond to two or more messages (i.e., a call request message and separate message conveying location information). For example, in 1xEV-DO Rev. A, the location information can be conveyed via an acknowledgment message (e.g., a STATUS-ACK message), which may be separate from the call request message. Alternatively, the location information can be conveyed via any other out-of-band message, or can be included within the call request message itself in protocols other than 1xEV-DO Rev. A, in an example.

AT 1 sends the configured multicast call request message to the application server 170 via the RAN 120, 520. Alternatively, AT 1 can send the multicast call request message and a separate message indicating AT 1's location to the application server 170 in 520. In any case, the application server 170 receives the multicast call request message and obtains an indication of AT 1's reported location in 520, and determines whether AT 1's reported location is within the defined location region from 500 in 525.

In a first example of the determination of 525 of FIG. 5, if AT 1 reports a service area identifier in 520 (e.g., of one or more sectors, a subnet, a PDSN service area and/or a multicasting service area), and the defined location region from 500 is also based on service area identifiers, the application server 170 can compare the reported service area identifier with the defined location region to determine whether AT 1 is within the defined location region. For example, if AT 1 reports SectorID #1, the application server 170 can check whether SectorID #1 is listed in the set of SectorIDs that comprise the defined location region. Alternatively, if the defined location region were to indicate a subnet identifier, the application server 170 first populates a list of SectorIDs from the designated subnet, and then compares AT 1's reported SectorID #2 with the populated SectorIDs from that subnet. Likewise, a similar set of multicasting service area identifiers, PDSN service region identifiers, subnet identifiers and/or sector identifiers can be populated in a similar fashion, such that a comparison can be made between AT 1's reported location, irrespective of its granularity, and the defined location region.

In a second example, it is possible that AT 1's reported location is formatted as a geographic set of coordinates whereas the defined location region is based on service area identifiers, or alternatively where AT 1's reported location is one or more service area identifiers while the defined location region is based on a range of geographic coordinates. In either case, the application server 170 can either map the service area identifier to a known set of geographic coordinates, or the geographic coordinates to a service area identifier, such that the reported location can be compared with the defined location region for evaluation by the application server 170. Methodologies of handling geographic coordinate evaluations are described in more detail below.

Below, additional examples are provided directed to determining whether AT 1's location falls within a 2-D geographic range, although it will be readily apparent how the methodologies described below can be expanded or generalized to a 3-D space (e.g., a sphere, such as the surface of the Earth).

A third example of the determination of 525 will now be described where the defined location region corresponds to a geographic range of coordinates and the reported position of AT 1 also corresponds to a set of geographic coordinates (e.g., or else corresponds to a service area identifier and is then mapped to the set of geographic coordinates). In this example, assume the physical region (which is defined on the earth's surface) from 500 is defined by the edges (e.g., or hyperplanes in K-dimensions) joining the vertices (e.g., N edges) of the polygon by means of N linear inequalities, as follows:

$$G1(x,y) <= 0; \quad \text{Equation 1}$$

$$G2(x,y) <= 0; \quad \text{Equation 2}$$

$$G3(x,y) <= 0; \quad \text{Equation 3}$$

$$GN(x,y) <= 0; \quad \text{Equation 4}$$

After establishing Equations 1 through 4, the application server 170 can verify that {A, B} satisfies each of the N inequalities. A fourth example of the determination of 525 will now be described where the defined location region corresponds to a geographic range of coordinates and the reported position of AT 1 also corresponds to a set of geographic coordinates (e.g., or else corresponds to a service area identifier and is then mapped to the set of geographic coordinates). In particular, in the fourth example (i.e., a 3D coordinate example) which will now be described, the geographic coordinates correspond to latitude/longitude positions on the surface of the Earth.

Referring to the fourth example for the determination of 525 of FIG. 5, the Earth can be modeled as a spheroid and with Req and Rpo as the equatorial and polar radii. The network operator of the application server 170 provides N latitudes and longitudes in an ordered list such that successive points in the list have an edge that defines a boundary of the defined location region from 500.

The latitudes and longitudes for the N points on the earth's surface are $\{\Phi1, \Theta1\}, \{\Phi2, \Theta2\} \ldots \{\Phi N, \Theta N\}$. These N points can be mapped to a 3-dimensional Cartesian coordinate system $\{x, y, z\}$ as:

$$Xi = Req \cos\Theta i \cos\Phi i; Yi = Req \sin\Theta i \cos\Phi i \text{ and } Zi = Rpo \sin\Phi i \quad \text{Equation 5}$$

Assuming that the N coordinates are provided in an ordered list, a hyper-plane can be defined as passing through 3 points; namely, the origin (0, 0, 0) and two points among the N points on the Earth's surface that are specified as an ordered list by the network operator of the application server 170. Each of these N hyper-planes can be denoted by the following linear equations:

$$P1(x,y,z) <= q1; \quad \text{Equation 6}$$

$$P2(x,y,z) <= q2; \quad \text{Equation 7}$$

$$PN(x,y,z) <= qN \quad \text{Equation 8}$$

Let the location reported by AT 1 be denoted by $\{X\_at, Y\_at, Z\_at\}$. With this assumption, AT 1 lies within the defined location region if AT 1's location satisfies the following equations (i.e., AT 1's reported location lies within the "bounding" polyhedral generated by the set of half-planes listed below):

$$P1(x,y,z) <= q1; \quad \text{Equation 9}$$

$$P2(x,y,z) <= q2; \quad \text{Equation 10}$$

$$PN(x,y,z) <= qN \quad \text{Equation 11}$$

and $$x <= Req + Rpo; \quad \text{Equation 12}$$

$$y <= Req + Rpo; \quad \text{Equation 13}$$

$$z <= Req + Rpo. \quad \text{Equation 14}$$

Note that the last three constraints may automatically be satisfied (i.e., Equations 16 through 18), and are specified to create a bounding polyhedral. While the hyper-planes area are relatively easy to compute, it is important to determine the half-plane for each hyper-plane in order to construct the inequalities ($Pi(x, y, z) <= qi$ for each $1 <= i <= N$). If there are N equations, then the number of possible half-planes is $2^N$, of which only one set of inequalities need be determined. Determining the correct set of inequalities can based upon an indication, from the network operator of the application server 170, of the orientation of each hyper-plane (in the x, y and z dimensions), as will be appreciated by one of ordinary skill in the art.

In a fifth example for the determination of 525 of FIG. 5, it will be appreciated that the defined location region from 500 can include both one or more service area identifiers, and one or more geographic coordinate ranges. Thus, AT 1's reported location from 520 can be compared against both the service area identifiers and geographic coordinate ranges of the defined location region in this example, using one of more of the first through fifth examples preceding the current example. A detailed example of evaluating this type of 'hybrid' defined location region has been omitted for the sake of brevity (e.g., see Appendix A).

Returning to 525 of FIG. 5, if the application server 170 determines that AT 1's reported location is not within the defined location region, the application server 170 can reject the multicast call and/or block the multicast call from being initiated by shutting down the multicast service entirely within the defined location region. This can be accomplished in a number of ways. For example, the operator of the application server 170 can change the DNS entries to return an invalid valid IP address and Port # for the registration handler (e.g., RLS, SIP registration server) and call hosting component (e.g., RD) for multicast ATs or clients that perform service discovery. In an alternative example, a network operator of the application server 170 can shut down the registration handler (e.g., CRH) so that registrations are not received by the application server 170 to disable new registrations (e.g., in this example, the multicast call requests from outside the defined location region are effectively blocked from ever arriving at the application server 170, such that the determination of 525 is built into the system, at the RAN 120 for example, and is not performed as an actual evaluation at the application server 170). In an alternative example, the application server 170 can remove or de-register an AT forcibly from one or more services (e.g., multicast service) supported by the application server 170. For example, the application server 170 can add an AT ID of the AT to a list of ATs that are to be denied the one or more services. Requests from a blocked AT may then result in a rejection message from the application server 170, or the application server 170 may simply ignore the request altogether.

In another example, multicast service can be disabled across an entire PDSN service area by having each AT that moves into a new PDSN register for the multicast service. The RLS can determine the SectorID or SID/NID/PZID/BASE_ID information that may be contained in a multicast registration message to the multicast service (e.g., a QChat SIP REGISTER message for QChat) in 1xEV-DO Rev. A and/or 3G 1x networks, respectively, and can determine which PDSN 160 the AT is in. This function can instead be performed at the CRH.

Returning to 525 of FIG. 5, if AT 1's reported location is determined to be within the defined location region, the application server 170 generates an announce message for announcing the requested multicast session, and forwards the announce message to the RAN 120 (e.g., via the PDSN 160 or BSN 165) for transmission to a plurality of access terminals belonging to the associated multicast group, 530.

FIG. 6 illustrates a continuation of the process of FIG. 5. Accordingly, in 600, a given AT ("AT 2") receives the announce message within a sector of the wireless communication system 100, and determines whether to accept the announced multicast call, 605. In 605, assume that AT 2 determines to accept the announced multicast call. Accordingly, in 610, AT 2 determines its location. The location determination of AT 2 in 610 of FIG. 6 may be performed using any of the location-determination methodologies described above with respect to 510 of FIG. 5, and as such will not be described further for the sake of brevity. Next, in 615, AT 2 either configures a multicast call accept message (e.g., an ANNOUNCE ACK message) to convey AT 2's determined location, or alternatively generates a separate message for conveying AT 2's location (e.g., similar to 515 of FIG. 5, although 615 is directed to the target AT side of the multicast call, whereas 515 is directed to the originator side of the multicast call).

AT 2 sends the configured multicast call accept message to the application server 170 via the RAN 120, 620. Alternatively, AT 2 can send the multicast call accept message and a separate message indicating AT 2's location to the application server 170 in 620. In any case, the application server 170 receives the multicast call accept message and obtains an indication of AT 2's reported location in 620, and determines whether AT 1's reported location is within the defined location region from 500 in 625. AT 2's location evaluation in 625 may be performed using any of the location-evaluation methodologies described above with respect to AT 1 in 525 of FIG. 5, and as such will not be described further for the sake of brevity.

Accordingly, if AT 2's reported location is determined not to be within the defined location region, AT 2 is not permitted to join the announced multicast session in 625. Alternatively, if AT 2's reported location is determined to be within the defined location region, AT 2 is permitted to join the announced multicast session in 625. Thus, assuming AT 2 is permitted to join the multicast session and is a first responder to the announce message, the application server 170 sends a message instructing AT 1 that the multicast session can begin in 625. AT 1 receives the message, plays a tone to a user of AT 1 indicating that he/she can begin speaking, and AT 1 begins forwarding voice data (e.g., or other data, in a push-to-transfer (PTX) session) to the application server 170 for transmission to the multicast group, 630. The application server 170 forwards the voice data, or multicast packets, for transmission by the RAN 120 to the multicast group members that have registered for the given multicast session, 635, and at least the registered multicast group members, including AT 2, monitor the given multicast session, 640.

FIG. 7 illustrates a continuation of the process of FIG. 6. In particular, FIG. 7 illustrates how to handle multicast group members that are permitted to join a multicast session when positioned within the defined location region, and later stray outside of the defined location region during the multicast session.

Thus, after the multicast communication session begins with a data exchange between AT 1 and at least AT 2 in 640 of FIG. 6, the application server 170 continues to relay data between a current floor-holder of the multicast session (e.g., which may or may not continue to be AT 1) and one or more target ATs, 700. Next, each of ATs 1 and 2 (e.g., and any other multicast group members) periodically re-determine their location, 705, (e.g., as in 510 of FIG. 5 or 610 of FIG. 6) and send their updated location to the application server 170 via the RAN 120, 710 (e.g., as in 515 of FIG. 5 or 615 of FIG. 6). The application server 170 determines whether the reported AT location remains within the defined location region, 715 (e.g., as in 525 of FIG. 5 or 625 of FIG. 6). If the reported AT location remains within the defined location region, the process returns to 700 and the multicast session continues. Otherwise, the AT associated with the reported location outside of the defined location region is dropped from the multicast session, 720.

Turning to the AT-side, after sending their respective locations in 710, each of ATs 1 and 2 determine whether they have been dropped from the multicast session, 725. If not, the process returns to 705, and ATs 1 and 2 continue to generate and transmit periodic location updates to the application server 170. Otherwise, if AT 1 and/or AT 2 has been dropped from the call due to a location violation, the process advances to 730.

In 730, the dropped AT periodically re-determines its location, and the dropped AT transmits the location update to the application server 170, 735. The rate at which the dropped AT re-determines its location in 730 need not be the same rate at which the location re-determinations are made in 705. Alternatively, the re-determination can be event driven instead of periodic (e.g., send a location update upon power-up, entry into a new subnet, etc.). The application server 740 checks the dropped AT's reported location and determines whether the dropped AT has re-entered the defined location rejoin. If not, the application server 170 does not permit the dropped AT to rejoin the multicast session. Otherwise, if the application server 170 determines that the dropped AT has re-entered the defined location region in 740, the application server 170 invites the dropped AT back into the multicast session, 745. In 750, the dropped AT determines whether it can rejoin the multicast session. If not, the process returns to 730 and repeats. Otherwise, if the application server 170 has indicated the dropped AT can rejoin the multicast session, the dropped AT sends a request to re-join the multicast session to the application server 170, 755.

While embodiments of the present invention described with respect to FIGS. 5 through 7 have been directed to enforcing multicast location restrictions at the application server 170, it will be appreciated that in other embodiments of the invention, while not illustrated explicitly, the restriction enforcement can be offloaded from the application server 170 to the RAN 120. For example, the application server 170 is capable of enforcing location-based restrictions because it is aware of the defined location region, and is informed with regard to the locations of ATs participating in the group session (e.g., via location reports as in 520 of FIG. 5, 620 of FIGS. 6, 710 and 735 of FIG. 7, etc.). The RAN 120, on the other hand, is typically aware of the locations of the ATs it serves, but is not necessarily aware of the defined location region that is specified by the application server 170 (e.g., at 500 of FIG. 5). Thus, so long as the RAN 120 is made aware of the defined location region for service restriction of the group session, it will be appreciated that the operations related to enforcement of the location-restriction in FIGS. 5-7 can be performed at the RAN 120 instead of the application server 170 in at least one embodiment. In a further example, the application server 170 can either inform the RAN 120 of the defined location region directly, or indirectly via one or more multicast group members participating in the group session. For example, assume that one or more multicast group members are provisioned with the defined location region from the application server 170 (e.g., as in 805 of FIG. 8, described below in more detail). Thereafter, when a given AT registers for a group session (e.g., by sending a BCMC-SFlowRegistration message), the RAN 120 can query the AT requesting registration with regard to whether the group session is associated with location restriction (e.g., by sending a StorageBLOBRequest message configured to request location restriction information for the group session). The AT requesting registration can then respond to the RAN 120's query by conveying the defined location region (e.g., within a StorageBLOBNotification message). Accordingly, throughout this Specification, it will be appreciated that any reference to an application server enforcing a location based restriction can alternatively be implemented at the RAN 120 at least in the above-described manner.

Further, in a RAN 120-implemented embodiment as described above, it will be appreciated that the location-reporting from multicast group members need not be performed, because as noted above the RAN 120 is already aware of the locations of the ATs being served (e.g., at least on a sector-by-sector basis). Thus, upon receiving a request to register to a multicast session at the RAN 120, in an example, the RAN 120 could simply compare the sector from which the registration message is received against the defined location region to determine whether to restrict the call, in one example.

Further, while embodiments of the present invention described with respect to FIGS. 5 through 7 have been directed to enforcing multicast location restrictions at the application server 170 (or the RAN 120), in other embodiments of the invention (e.g., FIGS. 8 through 10) the enforcement can be offloaded from the application server 170 and performed on the individual ATs that are requesting to participate in a given multicast session.

Accordingly, FIG. 8 illustrates a multicasting process including location-based multicast call restriction according to an embodiment of the present invention, where enforcement of the restriction occurs at individual ATs within the wireless communication system 100. Referring to FIG. 8, in 800, a network operator at the application server 170 defines a location region for multicast session restriction (e.g., for one or more specific multicast groups, for all multicast service in a defined area, etc.). 800 of FIG. 8 generally corresponds to 500 of FIG. 5, and as such a further description of how the defined location region can be generated has been omitted for the sake of brevity.

At some point after generating the defined location region in 800, the application server 170 notifies, 805, each multicast group member (e.g., belonging to a particular multicast group for the defined location region, or to all members if the multicast restriction is for all multicast communications managed by the application server 170). For example, the application server 170 can notify ATs individually with regard to the defined location region during power-up of the ATs, when the ATs contact the application server 170 to subscribe to a particular multicast group, over a provisioning interface, etc. Alternatively, the notification of 805 can be an update to a previous defined location region allocated to the multicast group members, where the application server 170 can notify all multicast group members that are currently participating in multicast sessions. As will be appreciated, the defined location region can be provisioned to the AT along with the nature of the service to be restricted (e.g., a TV channel, multicast service, etc.), the time/duration/schedule of the restriction, etc. The provisioning interface of 805 can be via a carrier provisioning system (CPS), in an example, and can be accomplished in an event-driven manner (e.g., upon power-up, upon service activation at the application server 170, etc.) via out-of-band signaling. This type of provisioning interface permits the application server 170 to push information to the handset(s) in a well-defined format to each individual user. Alternatively, if the restriction is for multiple users, in an example, the application server 170 can use group communication (e.g., a multicast message, such as BCMCS) to inform a high number of ATs of the restriction, which can increase an efficiency of the notification if a relatively large number of ATs require the notification. At the handset side, the AT can then add the defined location region and associated restriction information to a coverage map, so a user of the AT is aware of where particular services are available, or where different degrees of restriction to services are present. In the example of FIG. 8, for convenience of explanation, assume that the notification of the defined location region to ATs 1 and 2, which belong to the same multicast group, occurs at some point before AT 1 attempts to initiate a multicast session with at least AT 2. Again, while FIGS. 8 to 10 are directed to permit-or-block multicast restrictions, other embodiments can restrict other types of communication sessions at varying degrees of restriction based on location.

At some point after receiving the notification of the defined location region that restricts at least AT 1's multicast group (e.g., and possibly all other multicast service based on the defined location region), AT 1 determines whether to initiate a multicast call, 800. For example, if the multicast call corresponds to a PTT call, a user of AT 1 can press a PTT button in 810 to initiate the multicast call attempt. In 815, AT 1 determines its location using any of the location determination methodologies described above with respect to FIG. 510 of FIG. 5. After AT 1 determines its location (e.g., or SectorID, a subnet identifier, a geographic coordinate of AT 1 and/or AT 1's serving base station, etc.), instead of reporting the location to the application server 170 along with a multicast call request, AT 1 evaluates its location determined at 815 to determine whether AT 1 is within the defined location region received at 805, 820. In an example, the location evaluation of 820 of FIG. 8 performed at AT 1 may be performed using any of the location evaluation examples given above with respect to 525 of FIG. 5 (e.g., a SectorID comparison, a geographic coordinate-checking algorithm, etc.), and as such a further description thereof has been omitted for the sake of brevity.

If AT 1 determines that its location is not within the defined location region, AT 1 blocks the multicast call request from being transmitted in 825. A user of AT 1 can be notified with regard to why the call was blocked, in an example (e.g., AT 1 may display an "Out of Location Range" message). Conveying service restriction information to the AT is discussed in more detail below with respect to FIG. 11. Otherwise, if AT 1 determines that its location is within the defined location region, the process advances to 900 of FIG. 9.

FIG. 9 illustrates a continuation of the process of FIG. 8. In 900 of FIG. 9, AT 1 transmits a multicast call request to the application server 170 via the RAN 120 to request initiation of a given multicast session. The application server 170 receives the multicast call request, generates an announce message for announcing the given multicast session and forwards the announce message to the RAN 120 for transmission to a plurality of ATs, 905. In this example, assume AT 2 is within the multicast group associated with the given multicast session. Accordingly, the announce message is transmitted at least within AT 2's sector from the RAN 120 in 905. As will be appreciated, the application server 170 need not evaluate AT 1's position (e.g., which the application server 170 does not know because it is not conveyed as in FIGS. 5 to 7) because the location-based call restriction is enforced on the handset or AT-side, in this example.

AT 2 receives the announce message and a user of AT 2 determines whether to accept the multicast call, 910. In this example, assume that AT 2, or the user of AT 2, determines to accept the call. Accordingly, AT 2 determines its location within the wireless communications system 100 in 915 (e.g., as in 610 of FIG. 6). Next, after AT 2 determines its location (e.g., or SectorID, a subnet identifier, a geographic coordinate of AT 2 and/or AT 2's serving base station, etc.), instead of reporting the location to the application server 170 along with a multicast call accept message, AT 2 evaluates its location determined at 915 to determine whether AT 2 is within the defined location region received at 805, 920. In an example, the location evaluation of 920 of FIG. 9 performed at AT 2 may be performed using any of the location evaluation examples given above with respect to 525 of FIG. 5 (e.g., a SectorID comparison, a geographic coordinate-checking algorithm, etc.), and as such a further description thereof has been omitted for the sake of brevity.

If AT 2 determines that its location is not within the defined location region, AT 2 blocks the multicast call accept message from being transmitted in 925. For example, AT 2 may block the call by ignoring the announce message altogether. Alternatively, while not shown in FIG. 9, AT 2 may send an indication that the announce message has been rejected by AT 2 to the application server 170 (e.g., an announce ACK (reject) message). A user of AT 2 can be notified with regard to why the announced multicast call was blocked or rejected, in an example (e.g., AT 2 may display an "Out of Location Range" message). Conveying service restriction information to the AT is discussed in more detail below with respect to FIG. 11. Otherwise, if AT 2 determines that its location is within the defined location region, the process advances to 1000 of FIG. 10.

FIG. 10 illustrates a continuation of the process of FIG. 9. In 1000 of FIG. 10, AT 2 sends a request to join the announced multicast session to the application server 170 via the RAN 120 (e.g., an announce ACK (accept) message). While not shown, AT 2 can also send a registration message to register for the multicast session with the RAN 120, such as a BCMC-SFlowRegistration message.

Assuming AT 2 is a first responder to the announce message, the application server 170 sends a message instructing AT 1 that the multicast session can begin in 1000. AT 1 receives the message, plays a tone to a user of AT 1 indicating that he/she can begin speaking, and AT 1 begins forwarding voice data (e.g., or other data in a push-to-transfer (PTX) or other transport session) to the application server 170 for transmission to the multicast group, 1005. The application server 170 forwards the voice data, or multicast packets, for transmission by the RAN 120 to the multicast group members that have registered for the given multicast session, 1010, and at least the registered multicast group members, including AT 2, monitor the given multicast session, 1015.

Returning to AT 1's side, or the originator side, AT 1 continues to forward voice packets associated with the multicast session, and periodically re-determines its location, 1020. AT 1 determines whether its re-determined location from 1020 remains within the defined location region, 1025, and continues the multicast session if AT 1 is determined to remain within the defined location region at least until a next periodic location-update in 1020. Otherwise, if AT 1 determines that its location has moved outside of the defined location region, AT 1 drops the call in 1030. As will be appreciated, if AT 1 is still the floor-holder when its call is dropped, one or more target ATs monitoring the given multicast session may also be affected by AT 1's call drop in 1030, although FIG. 10 has been illustrated and described as if AT 1 is not the floor-holder at this point for the sake of convenience.

Turning back to AT 2's side, or the target AT-side, AT 2 continues to monitor the given multicast session in 1015, and periodically re-determines its location, 1035 (e.g., similar to 1020, although AT 2's frequency of location checking need not correspond to AT 1's frequency). AT 2 determines whether its re-determined location from 1035 remains within the defined location region, 1040, and the process returns to 1015 where AT 2 continues to monitor the multicast session if AT2 is determined to remain within the defined location region at least until a next periodic location-update in 1035. Otherwise, if AT 2 determines that its location has moved outside of the defined location region, AT 2 drops the call in 1045.

Returning to the originator-side, after AT 1 drops the multicast call in 1030, AT 1 continues to periodically re-determine its location (e.g., or alternatively, as discussed with respect to 730 of FIG. 7, this re-determination can be event driven instead of periodic), 1050, and to check whether AT 1's updated location has returned to the defined location region, 1055. If not, the process returns to 1050 and AT 1 waits for a next periodic location update. Otherwise, if AT 1 determines its updated location has returned to the defined location region in 1055, AT 1 sends a request to rejoin the multicast session to the application server 170 via the RAN 120 in 1060. While not shown in FIG. 10, AT 1 can return to monitoring the given multicast session if the application server 170 permits AT 1 to rejoin the session.

Likewise, at the target AT-side, after AT 2 drops the multicast call in 1045, AT 2 continues to periodically re-determine its location, 1065, and to check whether AT 2's updated location has returned to the defined location region, 1070. If not, the process returns to 1065 and AT 2 waits for a next periodic location update. Otherwise, if AT 2 determines its updated location has returned to the defined location region in 1070, AT 2 sends a request to rejoin the multicast session to the application server 170 via the RAN 120 in 1075. While not shown in FIG. 10, AT 2 can return to monitoring the given multicast session if the application server 170 permits AT 2 to rejoin the session.

Again, while embodiments of the present invention have been directed to an inclusive implementation of the defined location region (e.g., multicast calls are only permitted inside the defined location region), other embodiments of the present invention can alternatively be directed towards an exclusive implementation of the defined location region (e.g., multicast calls are only permitted outside the defined location region).

Further, it will be appreciated that the defined location region can be established on a per-group basis, such that each multicast group can potentially be restricted from or to a different location region, or alternatively can be established such that a particular type of multicast service (e.g., BCMCS, PTT, PTX, etc., or a particular protocol type such as QChat) can be restricted from or to certain location regions, which can potentially affect many (e.g., all) multicast groups attempting to operate inside or outside the defined location region.

In another example, the defined location region for restriction can be established on a per-user or per-AT basis. As discussed above, embodiments of the invention have generally been described with respect to group calls, in part because restrictions related to group calls can be more difficult to enforce than non-group calls, or unicast calls. However, it will be readily apparent how the embodiments can be modified to accommodate non-group calls, or unicast calls. Thus, it will be appreciated that the defined location region for restriction can affect a given user's unicast calls, group calls and/or transport sessions (which are not necessarily 'calls').

Further, it will be appreciated that above-described embodiments of the invention have generally described the defined location region as establishing explicit 'permit' or 'deny' zones, such that a particular service for an AT, group of ATs or all ATs is permitted or denied inside the defined location region, with the opposite permission setting being in effect outside the defined location region. However, in another example, the defined location region can correspond to one degree of restriction, while areas outside the defined location region can correspond to a different degree of restriction. For example, an area inside the defined location region can provide a given service (e.g., a TV channel) at a first billing or charging rate, and areas outside the defined location region can provide the given service at a second billing or charging rate. It will be appreciated that, in these examples, the application server 170 need not simply reject the call if the AT is determined not to be within the defined location region in 525 of FIG. 5 or 625 of FIG. 6, for example, but can rather provide the more limited or restricted service level. Likewise, instead of dropping the call altogether in 715 of FIG. 7, the application server 170 can rather drop the AT to the more limited or restricted service level. Similarly, at the handset side, AT 1 can request the more limited or restricted service in 825 of FIG. 8 or 925 of FIG. 9, instead of blocking the call altogether. Likewise, at the handset side, AT 1 can drop the call to the more limited or restricted service level in 1030 or 1045 of FIG. 10, instead of dropping the call altogether. Again, in these examples, the different levels of restriction may correspond to any type of service differentiation, including but not limited to different levels of guaranteed QoS resources, different billing or charging rates at which subscribers are charged for the service, different types of service (e.g., group calls via unicast, multicast, etc., or for media, a video-only area, an audio-only area, a txt-only area, a video-and-audio area, push vs. pull email forwarding, etc.), etc.

Further, it will be appreciated that the location restriction of FIGS. 8 through 10 is enforced at the handset, or AT, in automatic fashion, such that the location-based restriction is executed by the AT in accordance with the notification from the application server 170 received at 805 of FIG. 8. Thus, it will be appreciated that the user of the AT is not in direct control over the manner in which the location restriction is enforced because, for example, the determination and decision steps of 815 and 820 of FIG. 8, for example, are performed automatically by the AT itself.

However, it will be appreciated that, assuming the user of the AT has the AT in his/her possession, the user is in control over where the AT is located. Accordingly, a user interface (UI) for conveying potential restriction information to the user of the AT can permit the user to make informed decisions regarding how to obtain a desired level of service.

Figure 11:
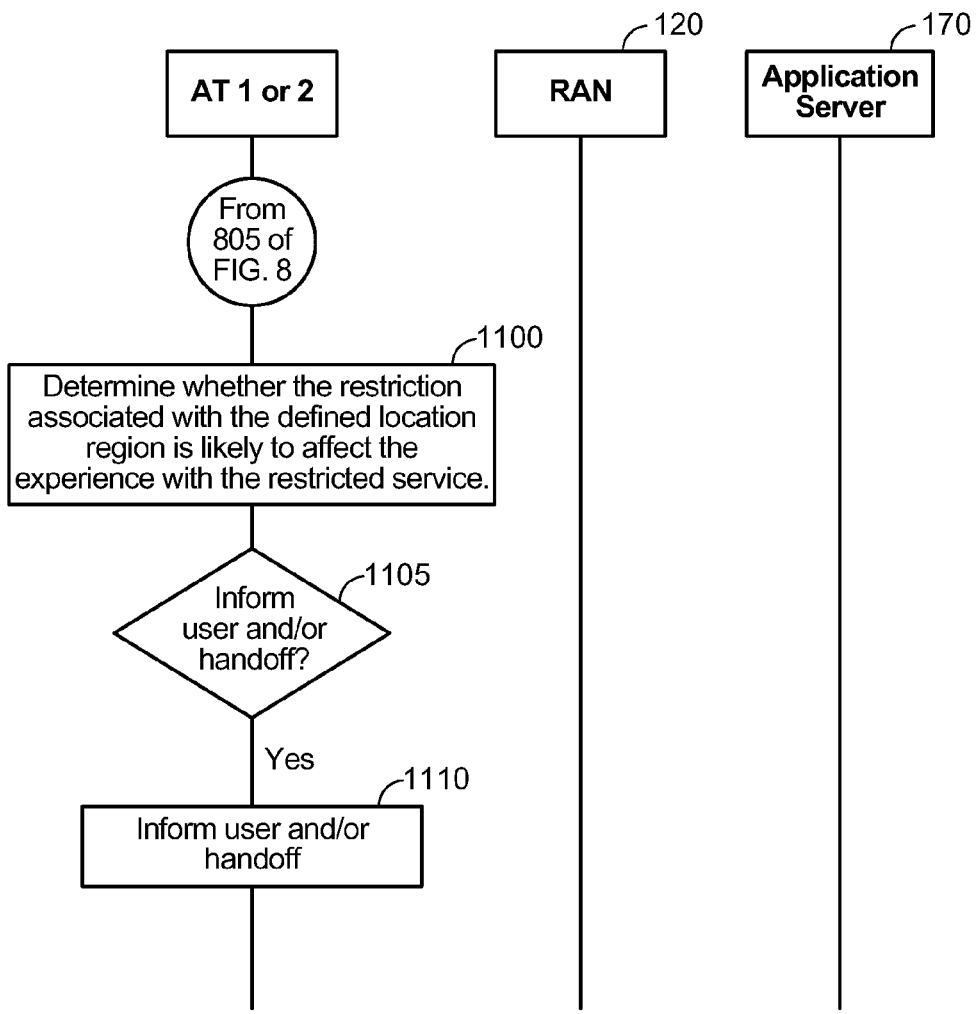
FIG. 11 illustrates a high-level user notification process regarding a location-based service restriction according to an embodiment of the invention.

FIG. 11 illustrates a high-level user notification process regarding a location-based service restriction according to an embodiment of the invention. Referring to FIG. 11, in 1100, at some point after receiving the defined location region associated with a service restriction in 805, a given AT (e.g., AT 1 or AT 2) determines whether the restriction associated with the defined location region is likely to affect an experience of the service for a user of the given AT. Based on the determination of 1100, the given AT determines whether to inform the user of information related to the service restriction and/or whether to handoff to another mechanism for obtaining the service, 1105. If the given AT determines to inform the user or to handoff to another service mechanism in 1105, the given AT informs the user of information related to the service restriction and/or hands off to another service mechanism in 1110.

In an example, referring to FIG. 11, assume that the user of the given AT is driving across the country, while also participating in a very important group call, the user has plotted a navigation route to the user's destination on the given AT. The given AT in this example performs the determining step of 1100 by comparing the navigation route with the defined location region (or regions) for the user's multicast service (e.g., where the defined location region was received in association with multicast service restriction in 805 of FIG. 8). If the given AT determines that the multicast service is restricted at some point during the navigation route, the given AT can inform the user (1105, 1110) (e.g., "Cannot Guarantee Multicast Service On Current Route", etc.) and permit the user to request that a new navigation route be plotted where the restriction can be avoided, or can simply offer the user a suggested alternative route. Alternatively, the user can be informed by displaying a coverage map of where multicast service is available, and also the current navigation route, such that the user of the given AT can figure out where, on the navigation route, multicast service will be restricted.

In another example, referring to FIG. 11, assume that the user of the given AT is watching a program on a given media channel (e.g., a TV channel), and is approaching a boundary of the defined location region for the program service, outside of which viewing of the program is, in some way, restricted. For example, the given AT can determine it is near such a boundary if the given AT is engaged in soft handoff and less than all of the base stations in the given AT's active set support the program service. In another example, the given AT can determine that the restriction is likely to affect the user's experience with the program service in 1100 based on the given AT's geographic proximity to the boundary, possibly in conjunction with the given AT's current trajectory toward the boundary. Thus, the given AT determines to inform the user in 1105, and warns the user in 1110 that the program service will be, in some manner, restricted if the user continues toward the boundary. Again, this can be conveyed via a coverage map, or via a simple text warning, or audio alert. Thus, the user of the AT can make his/her own decision on how to proceed based on the importance of the service versus the nature of the restriction, the geographical scope of the restriction, etc. In the case of a program service (e.g., a TV program, a radio program, etc.), the restriction outside the defined location region can be, for example, a higher charge for the program service (e.g., similar to a "roaming" service in conventional voice calls when an AT is out-of-network).

In yet another example, referring to FIG. 11, assume that the user actually travels outside of the defined location region with the given AT, that the user had been using the associated service on the given AT prior to crossing the boundary, and the given AT thereby enters a more restricted area. In this case, the given AT determines that the user's experience with the service is affected based on the restriction, 1100, determines to inform the user, 1105, and informs the user, 1110. Thus, if the restriction is cutting off the service altogether, the process of FIG. 11 in this example ensures that the user will not simply become confused and frustrated by the sudden service failure, but rather knows that the service was dropped due to the location change. The user thereby has a chance to travel back to service range. The given AT can output a coverage map or otherwise provide directions to the user so that the given AT can be brought back within range. Alternatively, if the restriction is a higher billing or charging rate for the service, the process of FIG. 11 ensures that the user will not receive an unexpectedly high bill, as the user would be informed that the rate associated with the program service increased after crossing the boundary.

In another example, for one reason or another, the given AT can be configured to initiate handoff between different service types (e.g., different carriers, different types of service such as WiFi vs. 3G vs. a wired connection, etc.) if the given AT expects a service level to drop off. Accordingly, as mentioned above and illustrated in FIG. 11, the given AT can optionally engaged in handoff from a current service mechanism to another service mechanism, wherein 'service mechanism' is intended to be interpreted broadly as any manner of obtaining the service (e.g., via a 3G cell phone network, via a WiFi connection, a wired Ethernet connection, a Bluetooth connection, group calls via unicast protocols, group calls via multicast protocols, etc., such that the service mechanism can be physical, or can be different protocols over the same physical mechanism). In an example, the expected service level drop-off can be the determination of 1100 of FIG. 11, wherein the given AT determines that the service used by the user of the given AT will be affected, potentially, by a service restriction (e.g., the given AT is outside the defined location region, or likely to soon be outside the defined location region). In another example, the given AT can determine it is either in an area of weak coverage for supporting the service. In any case, the given AT can attempt to handoff to another mechanism for supporting the user's service seamlessly (e.g., ideally so that the user is not aware, or at least not adversely affected by the switch). Thus, in this case, the given AT can initiate transmissions to the application server 170 via alternate mechanisms, such as use of Traffic Channels in the EV-DO system, or even physical technologies such as 1x, WiFi etc. For example, the given AT can determine that the quality of a link supporting a particular service is weak by measuring the packet loss rate and delay jitter at the application layer. Upon these metrics crossing a certain threshold that is application specific, the AT can trigger handoff to an appropriate PHY layer that provides an associated grade of reliability of service. It will be appreciated that this 'handoff' can be performed in parallel with, or in addition, to the processes of any of FIGS. 5 through 11. For example, if the 'handoff' is performed in response to the determination of 1100 of FIG. 11, the given AT can attempt to handoff to another mechanism for supporting the service, and only if unsuccessful determine to inform the user of the restriction for the current service mechanism in 1105. Alternatively, the given AT can both perform the handoff and inform the user of the restriction (and possibly, the handoff as well) in 1105/1110. Accordingly, the aforementioned 'handoff', at least in one example, can be performed within the framework of FIG. 11 at 1105 and 1110, as will be appreciated by one of ordinary skill in the art.

In another example, assume that the AT is using a given communication service and enters a 'dead zone' for the service, where a location-based restriction does not permit the AT to continue the given communication service over a given service mechanism (e.g., such as a cell phone 3G network, a WiFi network, etc.). In this example, assume that the levels of service restriction associated with the defined location region for the location-based restriction are specific to particular service mechanisms for particular services, instead of directed to the service in a general fashion (e.g., "permit group calls over unicast, but not over multicast in Sector X", such that group call service itself is not restricted, but rather only the manner in which group calls are obtained). In this example, even though the AT is outside the range that the service is provided, the AT may 'tunnel' or remotely log onto a computing device that is within the range (e.g., via a VPN service). In this case, the location of the computing device, and not the AT, is used for the location-restriction. Thus, even though the AT is outside the defined location region in this example, the restriction applies to the remote computing device which is still within the defined location region, such that service need not be cut off merely because the AT has exited the defined location region.

In another example, it will be appreciated that embodiments of the invention can be directed to any type of service (e.g., any multicast service, such as QChat and/or Yagatta).

Further, while above-described embodiments are generally directed to location-based service restriction enforced either at the application server 170, or alternatively at individual ATs within the system 100, it will be appreciated that other embodiments can be directed towards enforcement at different network entities. In this case, the application server 170 or the AT itself can inform the other network entity of the location-based restriction for enforcement, in an example. For example, the location-based service restriction can be enforced at the RAN 120, as will now be described with respect to FIGS. 12A through 13B.

Figure 12A:
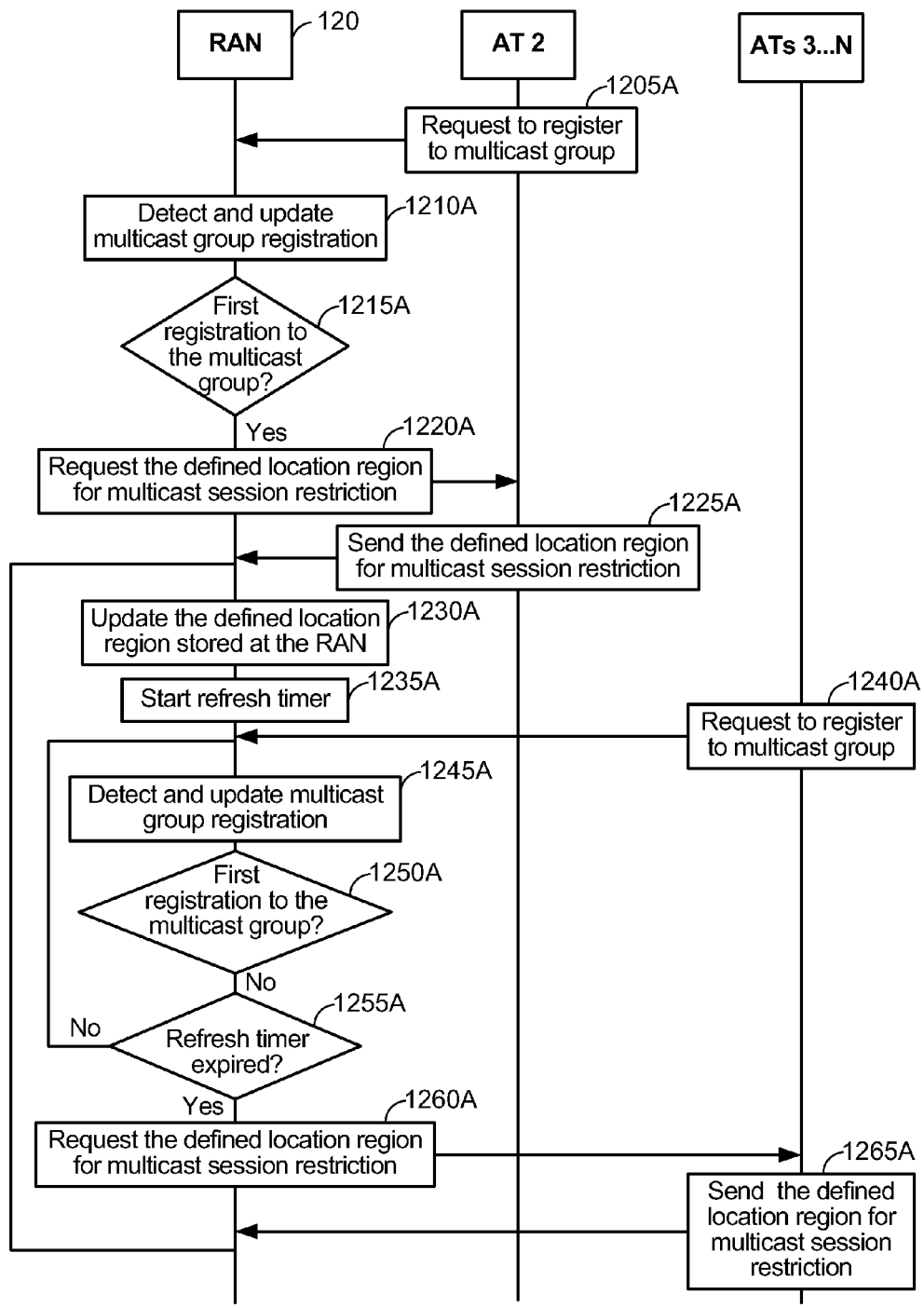
FIGS. 12A through 12C illustrate alternative processes by which an access network can be informed of a defined location region to be used in multicast service restriction in accordance with at least one embodiment of the invention.
Figure 12B:
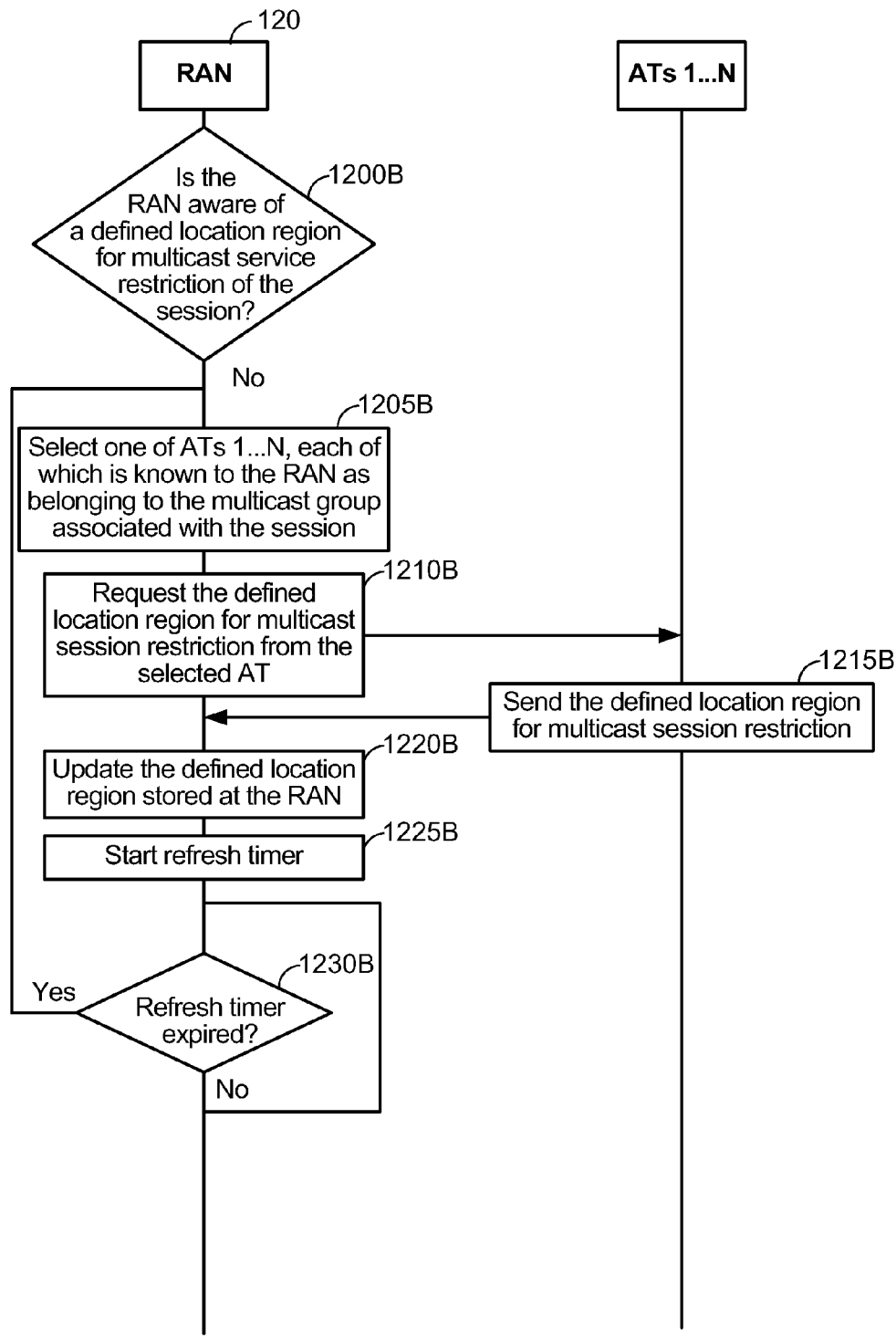
Figure 12C:
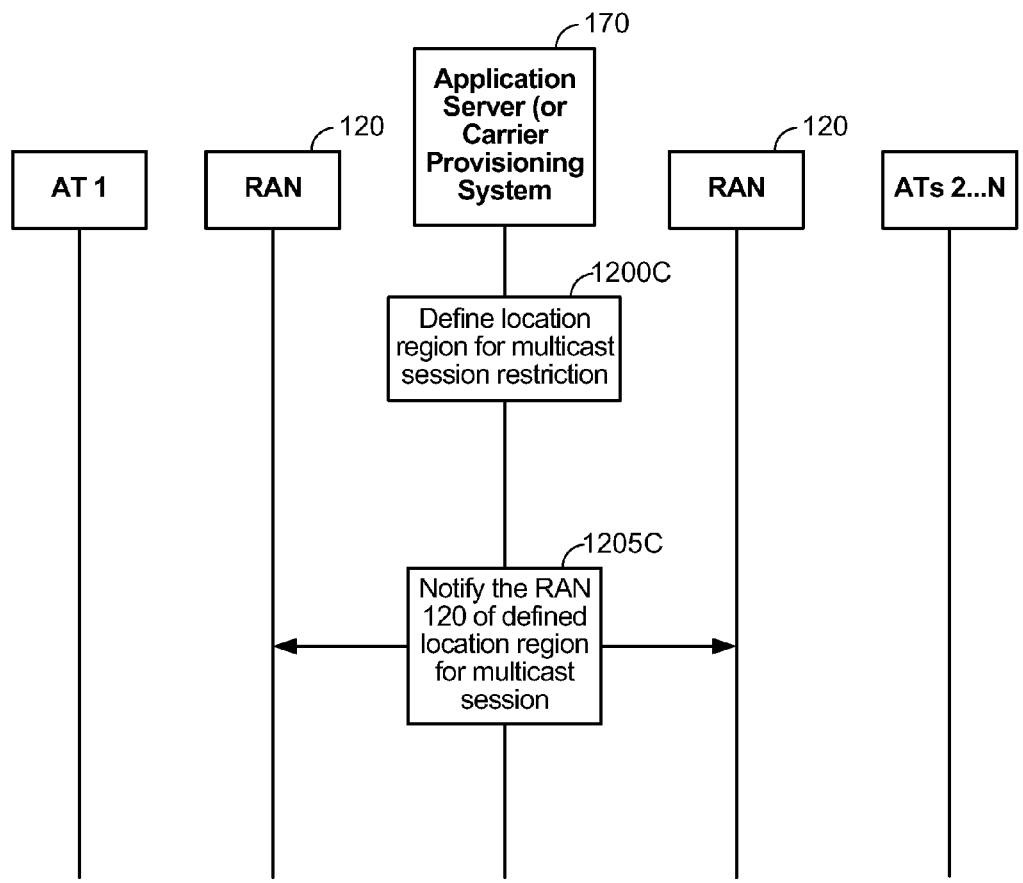

FIGS. 12A through 12C illustrate alternative processes by which the RAN 120 can be informed of a defined location region to be used in multicast service restriction. At the start of FIG. 12A, it may be assumed that the RAN 120 is not yet aware of the defined location region for multicast service restriction Referring to FIG. 12A, assume that AT 2 is the first multicast group member to send, 1205A, an a registration message (e.g., a BCMCSFlowRegistration message, a Group Member Notification (GMN) message, etc.) to request registration to a particular multicast group. The registration message of 1205A may either be sent in response to an announce message (e.g., as a BCMCSFlowRegistration message), upon power-up of AT 1 or upon AT 1 determining to change group membership (e.g., as a GMN message), or at any other time. Accordingly, the RAN 120 adds AT 2 to a list of registered ATs maintained at the RAN 120 for the multicast group, 1210A.

Because it has been assumed that the RAN 120 did not previously have knowledge of a defined location region for multicast service restriction of the multicast group, the RAN 120 determines whether AT 2 is the first AT to register to the multicast group, 1215A. In this case, AT 2 is the first AT to register, and as such the RAN 120 sends a message to AT 2 to request that AT 2 send the defined location region to the RAN 120, 1220A. In the embodiment of FIG. 12A, it may be assumed that one or more of ATs 2 . . . N have previously been provisioned with the defined location region.

Accordingly, it may be assumed that AT 2 is aware of the defined location region, and AT 2 responds to the defined location region request by sending the defined location region, or an indication that there is no location-based restriction for the session, 1225A. In an example, both the defined location region request and defined location region answer of 1220A and 1225A, respectively, may be implemented via StorageBlob* messaging. For example, the message of 1220A may correspond to a StorageBlobRequest message, and the message of 1225A may correspond to a StorageBlob-Notification message.

After receiving the defined location region from AT 2, the RAN 120 updates its records to reflect the defined location region for multicast service restriction of communication sessions involving the multicast group, 1230A, and starts a refresh timer having a given expiration period, 1235. In an example, the given expiration period of the refresh timer corresponds to a time at which a reported defined location region is expected to become 'stale' and should be refreshed via another AT-query for the defined location region. In an example, the given expiration period of the refresh timer may be established by an operator of the RAN 120.

Next, assume at least one additional AT among ATs 3 . . . N sends, 1240A, a registration message for registering to the multicast group (e.g., a BCMCSFlowRegistration message, a GMN message, etc.) to the RAN 120. Accordingly, the RAN 120 adds ATs 3 . . . N to a list of registered ATs maintained at the RAN 120 for the multicast group, 1245A.

Next, the RAN 120 determines whether the registration message received at 1240A is the first registration to the multicast group, 1250A. Because AT 2 already registered to the multicast group in 1205A, the RAN 120 determines that the AT requesting registration is not the first AT to request registration to the multicast group, and the RAN 120 then determines whether the refresh timer is expired, 1255A. If the refresh timer is not expired, the process returns to 1245A and the RAN 120 waits to receive more registration requests for the multicast group. Otherwise, if the refresh timer is expired, the RAN 120 sends another request for the defined location region to the AT that has requested registration, 1260A, the requested registration, and that AT responds with the defined location region, 1265A, and the process returns to 1230A.

While it has been generally assumed that ATs 2 . . . N are each aware of the defined location region for the multicast session, in other embodiments this is not necessarily the case. Accordingly, if AT 2 were not aware of the defined location region, the response sent in 1225A would not convey the defined location region to the RAN 120. Accordingly, the RAN 120 would then handle a next AT to register to the multicast session as if it were the first AT to request registration, such that the defined location region would again be requested from the more recent registering AT irrespective of whether the refresh timer is expired, and so on. After obtaining the defined location region for the first time from any AT, the process advances to 1230A and continues as described above.

As will be appreciated by one of ordinary skill in the art, the RAN 120 is provisioned with the capability with the ability to distinguish between groups that are restricted by defined location regions, and unrestricted groups. FIG. 12A thereby illustrates a process that assumes the RAN 120 knows that the multicast group corresponds to a group that is restricted by a defined location region, although the RAN 120 does not know the actual defined location region at the beginning of FIG. 12A. There are many different ways the multicast group can be flagged such that the RAN 120 knows to query for the defined location region. For example, groups having a defined location region may be configured by the application server 170 to utilize a BCMCSFlowID from a set of predetermined BCMCSFlowIDs (e.g., within a reserved range or block of BCMCSFlowIDs). Thus, in this example, if the multicast session has a BCMCSFlowID that corresponds to one of the set of predetermined BCMCSFlowIDs the RAN 120 becomes aware that there is a defined location region for restricting a multicast session involving the multicast group. In an alternative example, a given range of UDP port numbers may be reserved for multicast sessions restricted by a defined location region, such that if the multicast session has a UDP port number that is within the range of UDP port numbers the RAN 120 becomes aware that there is a defined location region for restricting a multicast session involving the multicast group.

While the process of FIG. 12A described above conditions queries for the defined location region upon receiving a registration request at the RAN 120, other embodiments need not wait for registration messages before querying ATs for the defined location region, as will be described next with respect to FIG. 12B. The process of FIG. 12B may either be performed throughout operation of the wireless communication system 100 irrespective of whether an associated group communication session is active, or alternatively may only be performed when the associated group communication session is active (e.g., starting when an announce message is received at the RAN 120, and ending when the group communication session times out due to inactivity, etc.).

Referring to FIG. 12B, the RAN 120 determines whether it is aware of a defined location region for use in multicast service restriction of a group communication session, 1200B. For convenience of explanation, assume that the RAN 120 is not yet aware of the defined location region. The RAN 120 then obtains a list of ATs 1 . . . N, each of which is known to belong to the multicast group associated with the group communication session, and selects one of ATs 1 . . . N, 1205B. In an example, the selection of 1205B may be a random selection.

The RAN 120 then sends a request for the defined location region of the group communication session to the selected AT, 1210B. For example, the message of 1210B may correspond to a StorageBlobAssignment message. The selected AT responds with the defined location region, or an indication that there is no location-based restriction for the session, 1215B. The RAN 120 updates its records to reflect the reported defined location region (or absence of one), 1220B. The RAN 220 then starts a refresh timer, 1225B. The RAN 120 waits until the refresh timer is expired, 1230B, and then returns to 1205B and repeats the process.

While the processes of FIGS. 12A and 12B described above are directed to reporting the RAN 120 with the defined location region from one or more ATs belonging to a particular multicast group, the RAN 120 may alternatively be directly provisioned with the defined location region by the application server 170. In this case, the multicast group members or ATs 1 . . . N may also be provisioned with the defined location region by the application server 170 (e.g., as in 805 of FIG. 8), or may not be so provisioned. If the ATs 1 . . . N are not provisioned with the defined location region by the application server 170, ATs 1 . . . N may either be provisioned with the defined location region by the RAN 120, or may remain unaware of the location-based restriction and instead rely on the RAN 120 for enforcing the location-based restriction.

Referring to FIG. 12C, in 1200C, a network operator at the application server 170 defines a location region for multicast session restriction (e.g., for one or more specific multicast groups, for all multicast service in a defined area, etc.). Alternatively, a network operator of a carrier provisioning system (CPS) that is separate from the application server 170 may perform the operation of 1200C. 1200C of FIG. 12C generally corresponds to 500 of FIG. 5 and/or 800 of FIG. 8, and as such a further description of how the defined location region can be generated has been omitted for the sake of brevity. Likewise, while 500 of FIGS. 5 and 800 of FIG. 8 have been described as performed at the application server 170, it will be appreciated that the defined location region from 500 may be input at the CPS and then provisioned to the application server 170, and that the defined location region from 800 may be input at the CPS and then provisioned to the individual ATs as in 805. Thus, illustrations in the Figures related to the application server 170 are intended to encompass the CPS, even though the CPS may be structurally separate from the application server 170. At some point after generating the defined location region in 1200C, the application server 170 (or CPS) notifies, 1205C, the RAN 120 of the defined location region for the multicast sessions involving a particular multicast group.

Figure 13A:
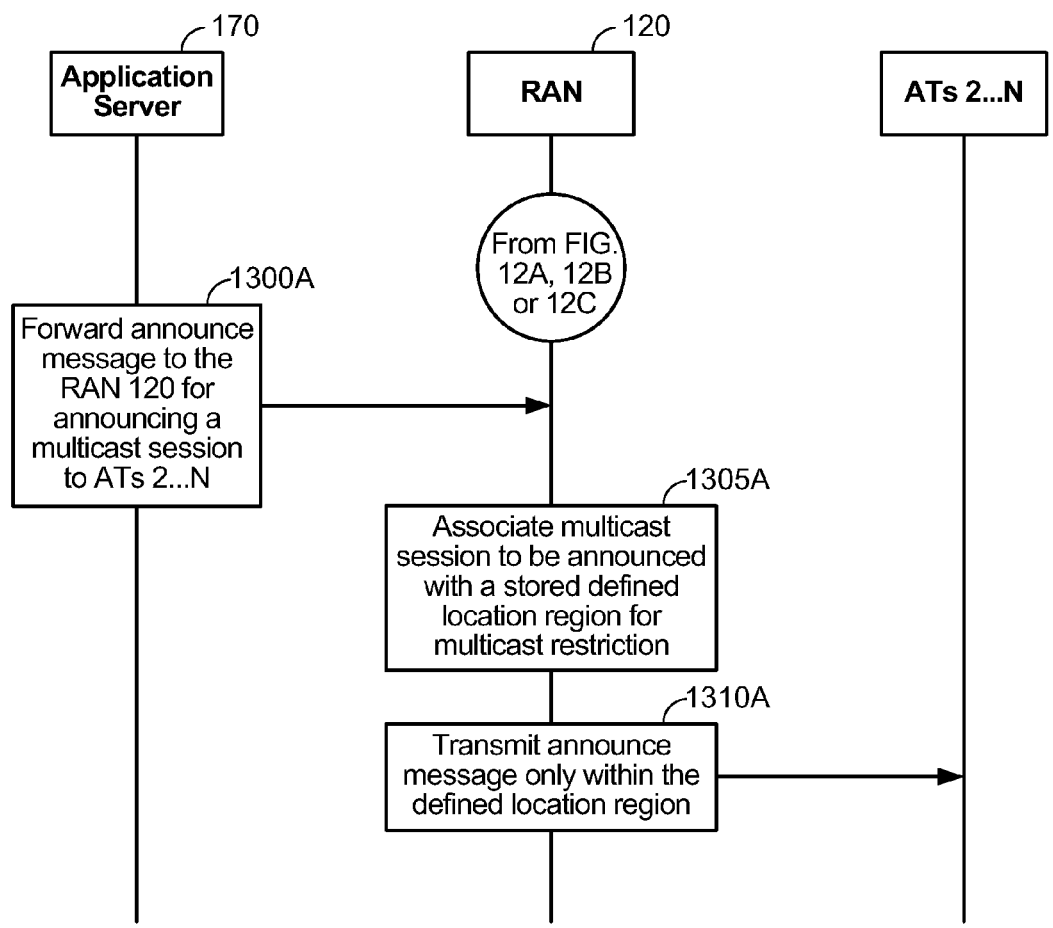
FIG. 13A illustrates a multicasting process including location-based multicast call restriction enforced at an access network according to an embodiment of the present invention.
Figure 13B:
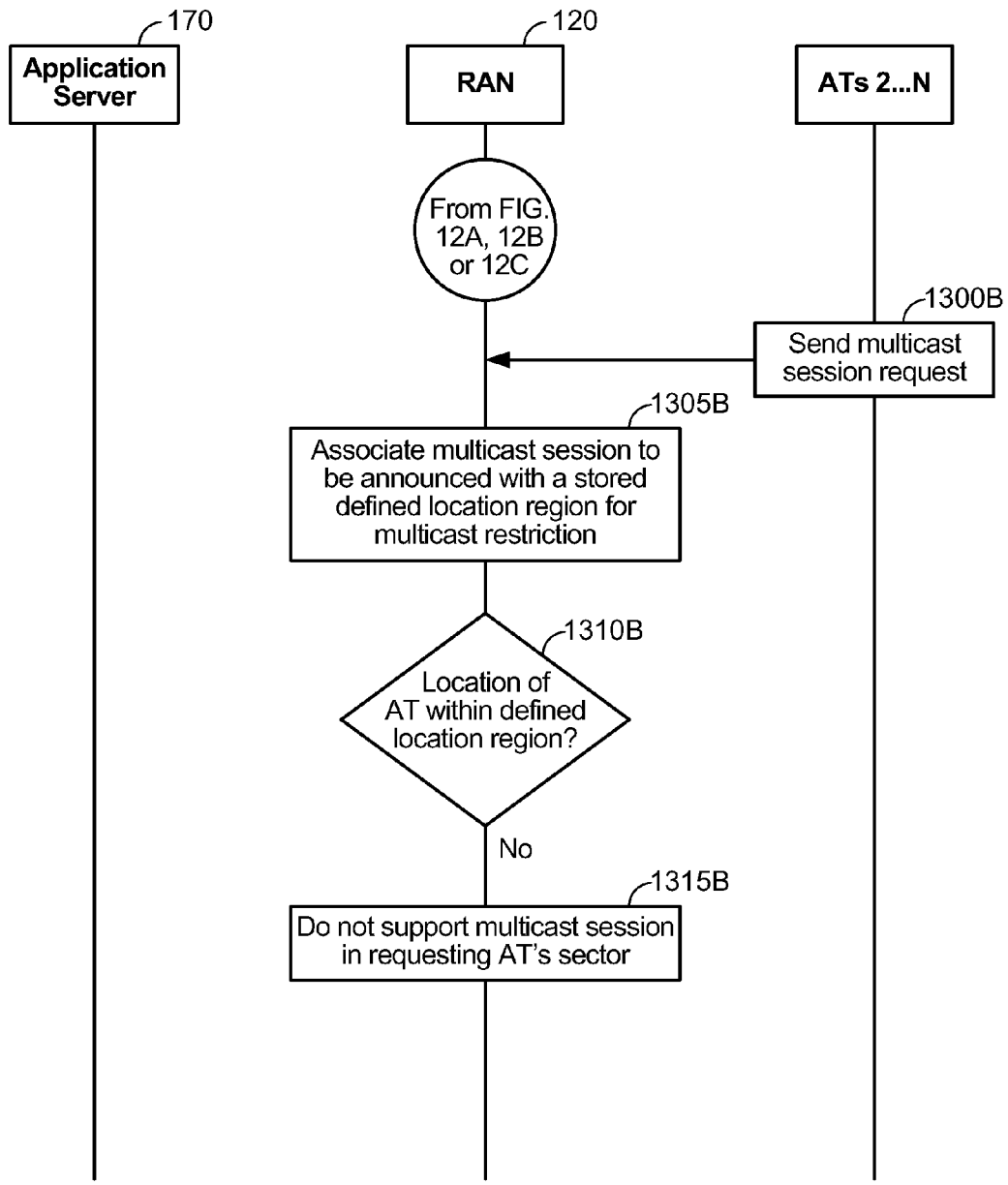
FIG. 13B illustrates another multicasting process including location-based multicast call restriction enforced at the access network according to an embodiment of the present invention.

Next, examples of RAN-enforced location-based restriction implementations are provided with respect to FIGS. 13A and 13B. It will be appreciated that the processes of 13A and 13B may be performed in place of the AT-enforced or application server-enforced embodiments described above, or alternatively could be performed in parallel with the above-described embodiments.

Referring to FIG. 13A, assume that the process of FIG. 12A, 12B and/or FIG. 12C executes sufficiently such that the RAN 120 has been provisioned with a defined location region for restricting multicast service for a particular multicast group or session before a next announcement for the multicast session. Next, the RAN 120 receives an announce message from the application server 170 for transmission to ATs 2 . . . N, 1300A. The RAN 120 compares the announce message with its stored defined location region, and determines to restrict the announced session in accordance with the defined location region, 1305A. In 1310A, the RAN 120 transmits the announce message only within the defined location region, even if one or more of ATs 2 . . . N are expected to be outside of the defined location region. It will further be appreciated that the RAN 120 can simply transmit the announce message in each sector of the defined location region in 1310A, or can transmit the announce message within a smaller subset of the defined location region's sectors by reducing the announce region based on where ATs 2 . . . N are expected to be located within the defined location region. Thus, traffic associated with the announce message can be reduced because the RAN 120 need not announce the session in areas that are not intended to support the multicast session. This embodiment assumes that the multicast service restriction corresponds to a complete denial of multicast service outside of the defined location region, which as discussed above is not necessarily the case. In another embodiment, the RAN 120 can, for example, announce the multicast session in different manners inside or outside of the defined location region. For example, the RAN 120 can announce the multicast session within a data-over-signaling (DoS) message within the defined location region, and can announce the multicast session outside of the defined location region via standard paging of the target ATs, which is slower and can be considered a degraded service as compared to the DoS announce transmission.

Referring to FIG. 13B, assume that the process of FIG. 12A, 12B and/or FIG. 12C executes sufficiently such that the RAN 120 has been provisioned with a defined location region for restricting multicast service for a particular multicast group or session. Next, the RAN 120 receives either (i) a request to register to a given multicast session that has already been announced, or (ii) a request to initiate the given multicast session from a call originator, 1300B. In an example, if the request of 1300 is a registration request, the registration of 1300B may be prompted by an announce message, by a broadcast overhead message (BOM) (e.g., RFDB=1), or by one of ATs 2 . . . N handing off to a different sector that either is not carrying the multicast session or is not advertising a supported multicast session in a BOM (e.g., the BCMCSFlowID for the given multicast session is not listed in the BOM). Thus, the registration message of 1300B may be prompted in many different potential ways.

Next, the RAN 120 compares the location of the requesting AT with its stored defined location region, and determines to restrict the announced session in accordance with the defined location region, 1305B. The RAN 120 then determines whether the requesting AT in 1300B is within the defined location region. The determination of 1310B can be based on a comparison between a current serving sector of the requesting AT, which is known at the RAN 120, with the defined location region, in an example. In an alternative example, while not shown explicitly within FIG. 13B, the requesting AT can convey its location to the RAN 120 dynamically (e.g., its geographic location, etc.) and the RAN 120 may use the dynamic location information of the requesting AT in the determination of 1310B. If the RAN 120 determines the requesting AT to be outside of the defined location region, the RAN 120 denies the request of 1300B and does not support the multicast session within the sector of the requesting AT. Otherwise, if the RAN 120 determines the requesting AT to be within the defined location region, the RAN 120 determines to support the multicast session within the sector of the requesting AT. This embodiment assumes that the multicast service restriction corresponds to a complete denial of multicast service outside of the defined location region, which as discussed above is not necessarily the case. In another embodiment, the RAN 120 can simply enforce the higher or lower restriction level if the determination of 1310B determines the AT to be outside of the defined Accordingly, as will be appreciated by one of ordinary skill in the art, the defined location region can be used to restrict multicast service, and the enforcement of the service restriction can be performed at the individual ATs, the RAN 120, the application server 170 or any combination thereof.

Further, while above-described embodiments of the invention include references to multicast sessions, multicast groups, etc., it will be appreciated that references to 'multicast' are intended to include group calls supported by IP multicasting protocols (e.g., one or more sectors transmits messaging on a downlink shared channel intended to be decoded, potentially, by multiple ATs in the sector) or group calls supported by IP unicasting protocols (e.g., each registered multicast group member receives unicast messaging for the group session that is specifically intended for one particular multicast group member). Thus, the references to 'multicast' are not intended to preclude group calls supporting by IP unicasting protocols, and the above-described embodiments are compatible with either scenario.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 14:
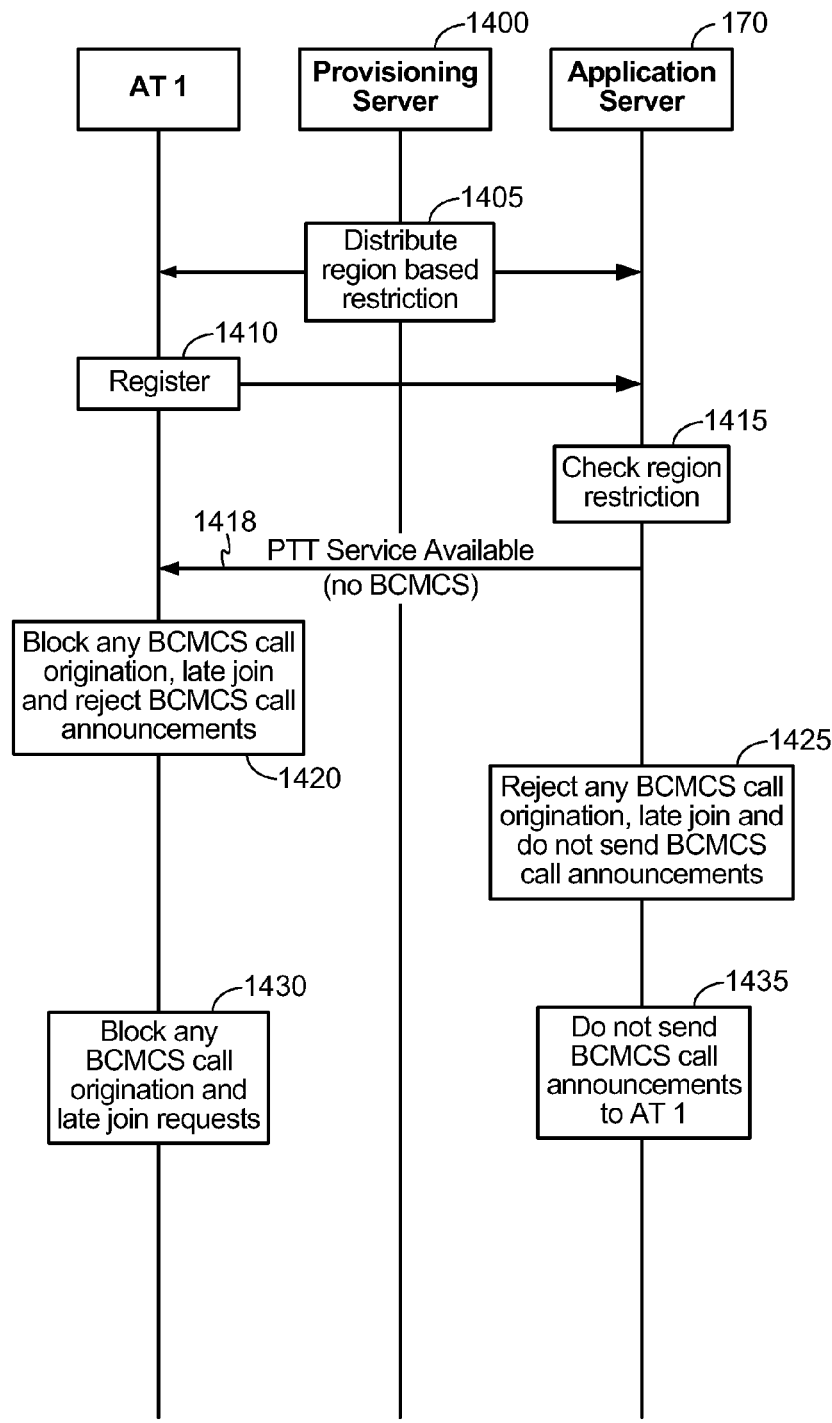
FIG. 14 illustrates another location-based multicast call restriction enforced mechanism according to an embodiment of the present invention.

While the foregoing disclosure shows illustrative embodiments of the invention, it should be noted that various changes and modifications could be made herein without departing from the scope of the invention as defined by the appended claims. For example, FIG. 14 illustrates a restriction based on region ID. In 1405 a region based restriction is distributed to the application server 170 and ATs (e.g., AT 1) from a Carrier Provisioning server 1400, prior to AT 1 registering in 1410. In 1415, the region restriction can be checked. For example, if AT 1 has a region ID of "A" and is restricted to use BCMCS only in region A, then based on the region restriction an indication that PTT (e.g., QChat™) services are available without BCMCS services can be sent 1418, if AT 1 is outside region A. Additionally, it will be appreciated that enforcement can occur either at the AT in 1420, the server in 1425 or via a combination of the AT and server (in 1430 and 1435). Accordingly, each of 1420, 1425 and the combination of 1430 and 1435 illustrate alternative implementations.

The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of determining whether to restrict a communication session based on an access terminal's location within a wireless communications system, comprising:
   predicting that a given access terminal will enter a location in the future, the given access terminal configured to participate in a given communication service that is configured for arbitration by an application server that is outside of each access network and each carrier network configured to serve the given access terminal;
   determining that the predicted location does not satisfy a given relationship with a defined location region, the defined location region establishing a first level of service restriction for the given communication service within the defined location region and establishing at least a second level of service restriction for the given communication service outside of the defined location region, wherein the first and second levels of service restriction are specific to the given communication service and are independent of service restrictions for services arbitrated by each access network or each carrier network configured to serve the given access terminal;
   notifying a user of the given access terminal that the given access terminal is predicted to enter the location in the future that does not satisfy the given relationship with the defined location region; and
   restricting the given access terminal in accordance with the first or second level of service restriction for the given communication service based on whether the given access terminal enters the predicted location that is determined not to satisfy the given relationship.

2. The method of claim 1, wherein the given access terminal is attempting to originate the given communication service.

3. The method of claim 2, wherein the given communication service corresponds to a multicast session, and the given access terminal initiates set-up of the multicast session.

4. The method of claim 1, wherein the given communication service is originated by another access terminal.

5. The method of claim 4, wherein the given communication service corresponds to a multicast session, and the given access terminal is a target access terminal for the multicast session.

6. The method of claim 1, wherein the first level of service restriction blocks the given communication service altogether, and the second level of service restriction permits the given communication service.

7. The method of claim 1, wherein the second level of service restriction blocks the given communication service altogether, and the first level of service restriction permits the given communication service.

8. The method of claim 1, wherein the first and second levels of service restriction correspond to different rates to charge the user of the given access terminal for the given communication service.

9. The method of claim 1, wherein the first and second levels of service restriction correspond to different degrees to which the given communication service is supported.

10. The method of claim 9, wherein the different degrees for supporting the given communication service correspond to (i) different charging rates to charge the user of the given access terminal for the given communication service, and/or (ii) permitting Internet Protocol (IP) unicast protocols to support the given communication service in only one of the first and second levels of service restriction.

11. The method of claim 1, wherein the given relationship is that the predicted location is included within the defined location region.

12. The method of claim 1, wherein the given relationship is that the predicted location is not included within the defined location region.

13. The method of claim 1, wherein the defined location region corresponds to one or more of a set of service area identifiers and a given geographic range.

14. The method of claim 13, wherein the set of service area identifiers includes one or more of a sector identifier, a base station identifier, a subnet identifier and a packet data service node (PDSN) identifier.

15. The method of claim 13, wherein the given geographic range corresponds to latitude and longitude coordinates.

16. The method of claim 1, wherein the given communication service corresponds to a multicast service for multicasting data during multicast sessions from a source access terminal to a plurality of different target access terminals registered to one of a plurality of multicast groups, and the defined location region defines the first and second levels of service restriction for the multicast service for at least one of the plurality of multicast groups.

17. The method of claim 16, wherein the defined location region affects each multicast group that complies with a particular type of multicast service.

18. The method of claim 17, wherein the particular type of multicast service is a multicast voice service or a multicast data service.

19. The method of claim 1, wherein the predicting, determining and restricting steps are directly implemented at the given access terminal.

20. The method of claim 19, wherein the predicting step predicts the predicted location based on a position acquisition procedure performed at the given access terminal.

21. The method of claim 1, wherein the predicting, determining and restricting steps are performed at a given network entity.

22. The method of claim 21, wherein the given network entity corresponds to the application server or a given access network configured to serve the given access terminal.

23. The method of claim 22, wherein the given communication service corresponds to a multicast service, and the given network entity is configured to manage multicast communications between a plurality of access terminals for the multicast service.

24. The method of claim 23, wherein the predicting step predicts the predicted location from a location message, received from the given access terminal, indicating a given location obtained by a position acquisition procedure performed at the given access terminal.

25. The method of claim 24, wherein the location message is included in one of a call request message, a StorageBlob-Notification/Complete message, or an EV-DO Connection Request message having a specially configured RequestReason field indicating the location, if the given access terminal is attempting to originate a given multicast session, and the location message is included in one of an announce acknowledgment (ACK) message or a StorageBlobRequest/Assignment message, if the given access terminal is attempting to join the given multicast session that has been originated by another access terminal.

26. The method of claim 22, wherein the given network entity corresponds to the given access network and the given communication service corresponds to a multicast service.

27. The method of claim 26, further comprising:
receiving, from the given access terminal, either (i) a request to register to a given communication group associated with the given communication service or (ii) a request to initiate set-up of a given multicast session that is configured to multicast data from a source access terminal to a plurality of different target access terminal that are registered to one of a plurality of multicast groups or (iii) a request to register to the given multicast session;
sending a first message to the given access terminal to request that the given access terminal report the defined location region; and
receiving a second message from the given access terminal that reports the defined location region if the given access terminal is aware of the defined location region.

28. The method of claim 27, wherein the first message corresponds to a StorageBlobAssignment message and the second message corresponds to a StorageBlobNotification message.

29. The method of claim 27, wherein the sending step is performed if (i) the request to register to the given multicast session is received and the given access terminal is a first responder to an announce message for the given multicast session, (ii) the request to register to the given communication group is received and the given access terminal is a first registrant to the given communication group, (iii) a timer started in conjunction with a previously reported defined location region expires before the request to register to the given multicast session is received from the given access terminal, or (iv) the timer started in conjunction with the previously reported defined location region expires before the request to register to the given communication group is received from the given access terminal.

30. The method of claim 26, further comprising:
starting a timer having a given expiration period;
upon expiration of the timer,
    selecting an access terminal from a plurality of access terminals that belong to a group associated with the given multicast session;
    sending a first message to the selected access terminal to request that the selected access terminal report the defined location region; and
    receiving a second message from the selected access terminal that reports the defined location region if the selected access terminal is aware of the defined location region.

31. The method of claim 30, wherein the first message corresponds to a StorageBlobAssignment message and the second message corresponds to a StorageBlobNotification message.

32. The method of claim 30, further comprising:
resetting the timer; and
repeating the selecting, sending and receiving steps upon expiration of the reset timer.

33. The method of claim 26, further comprising:
receiving the defined location region at the given access network from the application server.

34. The method of claim 26, wherein the restricting step restricts the manner in which the given access network announces a given multicast session, wherein the given multicast session is configured to multicast data from a source access terminal to a plurality of different target access terminal that are registered to one of a plurality of multicast groups.

35. The method of claim 34, wherein the restricting step restricts announcement of the given multicast session such that the given multicast session is only announced within sectors of the defined location region and is prohibited from announcement within sectors that are outside of the defined location region.

36. The method of claim 26, wherein the predicting, determining and restricting steps are performed in response to a registration message for the multicast service being received at the given access network from the given access terminal.

37. The method of claim 1, wherein the first and second levels of service restriction associated with the defined location region are specific to the given access terminal.

38. A network communication entity configured to selectively restrict a communication session based on an access terminal's location within a wireless communications system, comprising:
means for predicting that a given access terminal will enter a location in the future, the given access terminal configured to participate in a given communication service that is configured for arbitration by an application server that is outside of each access network and each carrier network configured to serve the given access terminal;
means for determining that the predicted location does not satisfy a given relationship with a defined location region, the defined location region establishing a first level of service restriction for the given communication service within the defined location region and establishing at least a second level of service restriction for the given communication service outside of the defined location region, wherein the first and second levels of service restriction are specific to the given communication service and are independent of service restrictions for services arbitrated by each access network or each carrier network configured to serve the given access terminal;
means for notifying a user of the given access terminal that the given access terminal is predicted to enter the location in the future that does not satisfy the given relationship with the defined location region; and
means for restricting the given access terminal in accordance with the first or second level of service restriction for the given communication service based on whether the given access terminal enters the predicted location that is determined not to satisfy the given relationship.

39. The network communication entity of claim 38, wherein the network communication entity corresponds to the given access terminal, the application server that arbitrates the given communication service or a given access network that serves the given access terminal.

40. A network communication entity configured to selectively restrict a communication session based on an access terminal's location within a wireless communications system, comprising:
logic configured to predict that a given access terminal will enter a location in the future, the given access terminal configured to participate in a given communication service that is configured for arbitration by an application server that is outside of each access network and each carrier network configured to serve the given access terminal;
logic configured to determine that the predicted location does not satisfy a given relationship with a defined location region, the defined location region establishing a first level of service restriction for the given communication service within the defined location region and establishing at least a second level of service restriction for the given communication service outside of the defined location region, wherein the first and second levels of service restriction are specific to the given communication service and are independent of service restrictions for services arbitrated by each access network or each carrier network configured to serve the given access terminal;
logic configured to notify a user of the given access terminal that the given access terminal is predicted to enter the location in the future that does not satisfy the given relationship with the defined location region; and
logic configured to restrict the given access terminal in accordance with the first or second level of service restriction for the given communication service based on whether the given access terminal enters the predicted location that is determined not to satisfy the given relationship.

41. The network communication entity of claim 40, wherein the network communication entity corresponds to the given access terminal, the application server that arbitrates the given communication service or a given access network that serves the given access terminal.

42. A non-transitory computer-readable storage medium comprising instructions, which, when executed by a network communication entity configured to selectively restrict a communication session based on an access terminal's location within a wireless communications system, cause the network communication entity to perform operations, the instructions comprising:
program code to predict that a given access terminal will enter a location in the future, the given access terminal configured to participate in a given communication service that is configured for arbitration by an application server that is outside of each access network and each carrier network configured to serve the given access terminal;
program code to determine that the predicted location does not satisfy a given relationship with a defined location region, the defined location region establishing a first level of service restriction for the given communication service within the defined location region and establishing at least a second level of service restriction for the given communication service outside of the defined location region, wherein the first and second levels of service restriction are specific to the given communication service and are independent of service restrictions for services arbitrated by each access network or each carrier network configured to serve the given access terminal;
program code to notify a user of the given access terminal that the given access terminal is predicted to enter the location in the future that does not satisfy the given relationship with the defined location region: and
program code to restrict the given access terminal in accordance with the first or second level of service restriction for the given communication service based on whether the given access terminal enters the predicted location that is determined not to satisfy the given relationship.

43. The non-transitory computer-readable storage medium of claim 42, wherein the network communication entity corresponds to the given access terminal, the application server that arbitrates the given communication service or a given access network that serves the given access terminal.

44. The method of claim 19,
wherein the second level of service restriction permits a call request message that is configured to request the application server to initiate setup of a session for the given communication service to be transmitted by the given access terminal, and wherein the first level of service restriction blocks the call request message from transmission such that the application server does not initiate setup of the session.

45. The method of claim 19, wherein the second level of service restriction permits a call acceptance message that is configured to request that the given access terminal be permitted to join a session for the given communication service that is originated by a different access terminal, and wherein the first level of service restriction blocks the call acceptance message from transmission such that the given access terminal is prohibited from joining the session.

46. The method of claim 19, wherein the first level of service restriction blocks the given communication service altogether, and the second level of service restriction permits the given communication service.

47. The method of claim 46, wherein the restricting step restricts the given access terminal in accordance with the first level of service restriction such that the given access terminal is prohibited from joining a new communication session corresponding to the given communication service and/or maintaining participation in an existing communication session corresponding to the given communication service while in the predicted location.

48. The method of claim 47, further comprising:

continuing to monitor a location status of the given access terminal while the first level of service restriction is active while the given access terminal is in the predicted location;

detecting, during the monitoring, that the location status of the given access terminal now satisfies the given relationship with the defined location region based on the given access terminal exiting the predicted location; and transitioning from the first level of service restriction to the second level of service restriction by transmitting a message to request that the given access terminal be permitted to join or re-join the new or existing communication session in response to the detection.

49. The method of claim 46, wherein the restricting step restricts the given access terminal in accordance with the second level of service restriction such that the given access terminal is permitted to participate in a given communication session corresponding to the given communication service if the given access terminal does not enter the predicted location.

50. The method of claim 49, further comprising:

continuing to monitor a location status of the given access terminal while the second level of service restriction is active while the given access terminal is not in the predicted location;

detecting, during the monitoring, that the location status of the given access terminal no longer satisfies the given relationship with the defined location region based on the given access terminal entering into the predicted location;

transitioning from the second level of service restriction to the first level of service restriction such that the given access terminal prohibits continued participation in the given communication session in response to the detection.

51. The method of claim 1, wherein the predicting step includes:

obtaining a future navigation route for the given access terminal; and determining that at least a portion of the future navigation route does not satisfy the given relationship with the defined location region, wherein the predicted location includes the portion of the future navigation route that does not satisfy the given relationship with the defined location region.

52. The method of claim 51, wherein the notifying step includes:

providing the user with an alert message that indicates that the future navigation route cannot guarantee continuous support for the given communication service, or providing the user with the future navigation route overlaid onto a coverage map for the given communication service.

53. The method of claim 52, wherein the alert message is an audio alert message or a text alert message.

54. The method of claim 1, wherein the predicting step includes:

detecting that the given access terminal is currently in a given location that satisfies the given relationship and is also in proximity to a boundary of the defined location region beyond which the given relationship is not satisfied.

55. The method of claim 54, wherein the detecting step includes:

determining that the given access terminal is engaged in soft handoff with at least one base station that does not satisfy the given relationship, or determining that the given access terminal is on a trajectory that is expected to move beyond the boundary.

56. The method of claim 54, wherein the notifying step includes:

presenting the user with an alert message that indicates that support for the given communication service will be lost if the given access terminal moves beyond the boundary.

57. The method of claim 1, further comprising:

detecting that the given access terminal enters the predicted location that is determined not to satisfy the given relationship, wherein the restricting step restricts the given access terminal in accordance with the first level of service restriction in response to the detection.

58. The method of claim 57, further comprising:

providing the user of the given access terminal, in response to the detection, with information that identifies a reason for why the restricting step restricts the given access terminal in accordance with the first level of service restriction.

59. The method of claim 58, wherein the information indicates that the reason is a location change of the given access terminal.

60. The method of claim 57, further comprising:

providing the user of the given access terminal, in response to the detection, with instructions for how to navigate to an area where the first level of service restriction would not be enforced.

61. The method of claim 60, wherein the instructions include directions to another area that satisfies the given relationship and/or providing the user with a coverage map for the given communication service.

* * * * *